US011707878B2

(12) United States Patent
Arahata et al.

(10) Patent No.: US 11,707,878 B2
(45) Date of Patent: Jul. 25, 2023

(54) RESIN MOLDING SYSTEM AND RESIN MOLDING METHOD

(71) Applicant: HONDA MOTOR CO., LTD., Tokyo (JP)

(72) Inventors: Yasushi Arahata, Tochigi (JP); Chiriki Watanabe, Tochigi (JP); Yushi Shinno, Tochigi (JP); Koji Watanabe, Tochigi (JP); Yusuke Takamura, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 199 days.

(21) Appl. No.: 17/418,859

(22) PCT Filed: Dec. 26, 2019

(86) PCT No.: PCT/JP2019/051246
§ 371 (c)(1),
(2) Date: Jun. 28, 2021

(87) PCT Pub. No.: WO2020/138340
PCT Pub. Date: Jul. 2, 2020

(65) Prior Publication Data
US 2022/0063174 A1 Mar. 3, 2022

(30) Foreign Application Priority Data
Dec. 28, 2018 (JP) ................ 2018-247341

(51) Int. Cl.
*B29C 51/04* (2006.01)
*B29C 51/10* (2006.01)
(Continued)

(52) U.S. Cl.
CPC ............. *B29C 51/04* (2013.01); *B29C 51/10* (2013.01); *B29C 51/18* (2013.01); *B29C 51/36* (2013.01); *B29L 2031/3008* (2013.01)

(58) Field of Classification Search
CPC ....... B29C 51/08; B29C 51/082; B29C 53/02; B29C 53/04; B29C 51/04; B29C 51/10; B29C 51/18; B29C 51/36
See application file for complete search history.

(56) References Cited

U.S. PATENT DOCUMENTS 2,968,064 A * 1/1961 Howell ................. B29C 51/262
65/263
3,655,320 A * 4/1972 Heavener .............. B29C 51/262
264/550
(Continued)

FOREIGN PATENT DOCUMENTS

JP      2013035249 A    2/2013
WO   2017047564 A1   3/2017

*Primary Examiner* — Matthew J Daniels
(74) *Attorney, Agent, or Firm* — CKC & Partners Co., LLC

(57) ABSTRACT

A resin molding system 1 comprises a gripping device 3 provided with a gripping frame 30 for gripping a resin sheet material 2, a heating device for heating the resin sheet material 2 and a molding device for clamping a lower die 61 and an upper die, and affixing the resin sheet material 2 to a substrate 63. The molding device is provided with: a lowering device for lowering the gripping device 3 and causing the resin sheet material 2 gripped by the gripping frame 30 to approach the lower die 61; and a pair of bent posts 67, 68 which are provided on both Y-direction sides of the lower die 61, and which come in contact with portions of the gripping frame 30 when the gripping device 3 is lowered, and which convexly bend the gripping frame 30 upward as viewed from the side along the Y-direction.

4 Claims, 16 Drawing Sheets

(51) Int. Cl.
    *B29C 51/18*     (2006.01)
    *B29C 51/36*     (2006.01)
    *B29L 31/30*     (2006.01)

(56) References Cited

U.S. PATENT DOCUMENTS

| | | | |
|---|---|---|---|
| 10,703,055 B2 * | 7/2020 | Robins | B64F 5/50 |
| 2014/0096897 A1 | 4/2014 | Katou et al. | |
| 2019/0084213 A1 | 3/2019 | Arahata et al. | |

* cited by examiner

RESIN MOLDING SYSTEM AND RESIN MOLDING METHOD

TECHNICAL FIELD

The present invention relates to a resin forming system end a resin forming method. In particular, the present invention relates to a resin forming system and a resin forming method in which a lower, die and an upper die provided on either side of a heated and stretched resin sheet material are clamped together and a product is manufactured.

BACKGROUND ART

A known method for forming a resin sheet, material and forming a akin of an instrument panel for a vehicle includes heating a resin sheet material, stretching the sheet material further, and using vacuum forming to adhere the sheet material to a base material of the instrument panel (see Patent Document 1, for example).

In the method of Patent Document 1, first, a resin sheet material gripped by a skin clamping apparatus is heated and stretched. Next, a lower die in which a base material has been placed in advance is, from below, brought towards the resin sheet material inclined at a predetermined angle with respect to the horizontal plane. Then, the base material is covered by the resin sheet material and the lower die and an upper die are clamped together. In this manner, a skin is formed on the base material.

Patent Document 1: Japanese Unexamined Patent Application, Publication No. 2013-35249

DISCLOSURE OF THE INVENTION

Problems to be Solved by the Invention

In the forming method of Patent Document 1, the edge portions of the four sides are gripped, and the lower die is brought towards the resin sheet material spread out in planar shape. When the lower die that protrudes upward is brought toward the resin sheet material, the timing of when the resin sheet material and the lower die surface of the lower die or the base material placed on the lower die surface come into contact with one another is different for each surface. Accordingly, the resin sheet material is stretched first at the portion that first comes into contact with the lower die surface or the base material and then sequentially at the portions that come into contact. This may cause the thickness of the formed resin sheet material to be non-uniform, resulting in a reduced quality of the product.

The present invention is directed at providing a resin forming system and a resin forming method that can form a resin sheet material with a uniform thickness.

Means for Solving the Problems (1) A resin forming system according to the present invention includes: a gripping device including a gripping frame for gripping a resin sheet material at Y side end portions on both sides in an X-direction and X side end portions on both sides in a Y-direction orthogonal to the X-direction; a heating device for heating a resin sheet material gripped by the gripping frame; a stretching device for stretching, in the X-direction and the Y-direction, a resin sheet material heated by the heating device and gripped by the gripping frame; and a forming device for clamping together a lower die and an upper die provided on either side of a resin sheet material stretched by the stretching device and forming a product, wherein the forming device includes a lowering device for lowering the gripping device and bringing a resin sheet material gripped by the gripping frame toward the lower die, and a pair of bending support portions provided on both sides in the Y-direction of the lower die, each one of the pair of bending support portions coming into contact with a portion of the gripping frame when the gripping device is lowered by the lowering device and bending the gripping frame to protrude upward in a side view along the Y-direction.

(2) In this case, preferably the gripping frame includes X side members that extend along the X side end portions of a resin sheet material; each one of the X side members includes a bending portion where the bending support portion makes contact, and a first gripping unit and a second gripping unit for gripping the X side end portions, provided on both sides in the X-direction of the bending portion; and end portions on both sides in the X-direction of the bending portion are joined, in a manner allowing for free rotation about a shaft that extends in the Y-direction, to the first gripping unit and the second gripping unit.

(3) In this case, preferably the bending portion includes a plurality of joint members that extend in the X-direction, and a plurality of rotation shafts that extend in the Y-direction and support, in a manner allowing for free rotation, end portions of adjacent pairs of joint members of the plurality of joint members.

(4) In this case, preferably the pair of bonding support portions each include a plurality of contact members with a contact surface that comes into contact with the joint members and a column member on which one of the plurality of contact members can be detachably mounted; and the contact surfaces of the plurality of contact members have different; lengths in the X-direction.

(5) A resin forming method according to the present invention includes: gripping with a gripping frame a resin sheet material at Y side end portions on both sides in an X-direction and X side end portions on both sides in a Y-direction orthogonal to the X-direction; heating a resin sheet material gripped by the gripping frame; stretching, in the X-direction and the Y-direction, a resin sheet, material after the heating and gripped by the gripping frame; and forming a product by lowering a gripping device including the gripping frame after the stretching, bringing a resin sheet material gripped by the gripping frame toward a lower die, then clamping together the lower die and an upper die provided opposing the lower die, wherein in the forming, after the gripping device is lowered until a portion of the gripping frame comes into contact with a pair of bending support portions provided on both sides in the Y-direction on the lower die, the gripping device is further lowered, bending the gripping frame to protrude upward in a side view along the Y-direction.

Effects of the Invention (1) According to the resin forming system according to the present invention, simply by lowering the gripping device via the lowering device, the resin sheet material can be bent in a shape corresponding to the protrusion shape of the lower die. Also, in this manner, by bending the resin sheet material in a shape corresponding to the protrusion shape of the lower die, the resin sheet material comes into contact with lower die and the base material placed in the lower die at roughly the same time. Thus, the thickness of the resin sheet material after forming can be made uniform, and the quality of the product can be improved. According to the resin forming system according to the present invention, by bending the gripping frame gripping the four side end portions of the resin sheet material, the resin sheet material is bent. This allows the resin sheet material to be stretched uniformly at all portions in the planar, direction and allows the thickness of the resin sheet material at all portions to be made uniform. This further improves the quality of the product. Also, in the present invention, the gripping frame can be bent using the force from the lowering device to lower the gripping device. Thus, there is no need to provide an additional actuator to bend the gripping frame. Also, because there is no need to provide an actuator to bend the gripping frame, the forming device can be made compact.

(2) According to the resin forming system according to the present invention, when the gripping device is lowered by the lowering device, the bending portion of the gripping frame comes into contact with the bending support portion, and when the gripping device is lowered further, the first gripping unit and the second gripping unit rotate about shafts that extend in the Y-direction. This bends the gripping frame and the resin sheet material gripped by the gripping frame in a shape corresponding to the protrusion shape of the lower die. According to the present invention, simply by lowering the gripping device via the lowering device, the gripping frame and the resin sheet material can be bent in a shape corresponding to the protrusion shape of the lower die without using a separate actuator. This allows the thickness of the resin sheet material after forming to be made uniform, improving the quality of the product.

(3) According to the resin forming system according to the present invention, simply by adjusting the length in the X-direction of the portion of the bonding support portion that comes into contact with the bonding portion and adjusting the number of joint members that come into contact with the contacting portion, the receiving width corresponding to the width in the X-direction of the top portion when the gripping frame and the resin sheet material are bent to protrude upward can be changed. According to the present invention, the bonding structure of the gripping frame can be changed to correspond in shape to the shape of the lower die to match lower dies of various shapes.

(4) According to the resin forming system according to the present invention, by simply selecting the contact member from the plurality of contact members that corresponds to the protrusion shape of the lower die and mounting this contact member on the column member, the bending structure of the gripping frame can be changed to a shape that corresponds to the protrusion shape of the lower die.

(5) According to the resin forming method according to the present invention, simply by lowering the gripping device, the resin sheet materiel can be bent in a shape corresponding to the protrusion shape of the lower die. Also, in this manner, by bending the resin sheet material in a shape corresponding to the protrusion shape of the lower die, the resin sheet material comes into contact with lower die and the base material placed in the lower die at roughly the same time. Thus, the thickness of the resin sheet material after forming can be made uniform, and the quality of the product can be improved. According to the resin forming system according to the present invention, by bending the gripping frame gripping the four side end portions of the resin sheet material, the resin sheet material is bent. This allows the resin sheet material, to be stretched uniformly at all portions in the planar direction and allows the thickness of the resin sheet material at all portions to be made uniform. This further improves the quality of the product. Also, in the present invention, the gripping frame can be bent using the force to lower the gripping device. Thus, there is no need to provide an additional actuator to bend the gripping frame. Also, because there is no need to provide an actuator to bend the gripping frame, the forming device can be made compact.

PREFERRED MODE FOR CARRYING OUT THE INVENTION

First Embodiment

A configuration of a resin forming system in which a resin forming method according to the first embodiment of the present invention is used will be described below with reference to the drawings. A resin forming system 1 and a resin forming method using the resin forming system 1 correspond to a device end a method for manufacturing a product (an instrument panel for a vehicle) by forming a resin sheet material and adhering the resin sheet material as a skin on a base material, of an instrument; panel of a vehicle.

Figure 1:
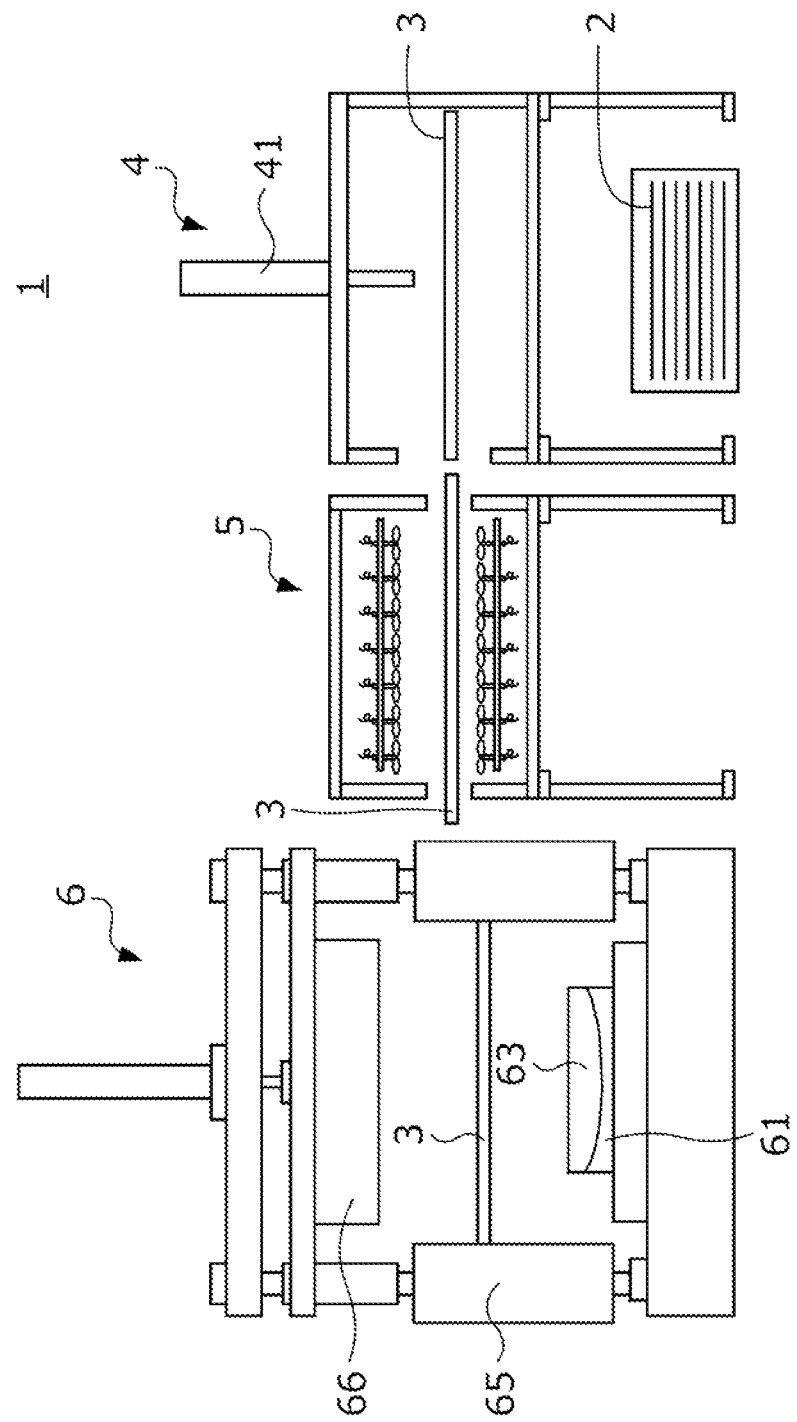
FIG. 1 is a diagram schematically illustrating the configuration of a resin forming system 1 in which a resin forming method according to a first embodiment of the present invention is used.

FIG. 1 is a diagram schematically illustrating the configuration of the resin forming system 1 in which the resin forming method according to the present embodiment is used. As illustrated in FIGS. 2 to 12, the resin forming system 1 includes a gripping device 3 for gripping a resin sheet material 2 and stretching and bonding the resin sheet material 2, a sheet supplying unit 4 for supplying the gripping device 3 with new resin sheet material 2, a heating device 5 for heating and softening the resin sheet material 2 gripped by the gripping device 3, and a forming device 6 for vacuum forming the resin sheet material 2 softened via heat via the heating device 5.

In the forming device 6, the gripping device 3 is configured to adhere the formed resin sheet material 2 as a skin to a base material 61 of an instrument panel. The gripping device 3 grips the resin sheet material 2 supplied by the sheet supplying unit 4, sequentially moves to the heating device 5 and then the forming device 6, and then returns to the sheet supplying unit 4 after the forming device 6 process is completed.

Suitable materials for the skin of an instrument panel can be used as the resin sheet material 2, these including a material made of a foamed layer of a polypropylene foamed body joined to a thin film of thermoplastic olefin. The resin sheet material 2 has a rectangular shape in a plan view corresponding to the skin of an instrument panel.

The resin sheet material 2 is obtained by cutting a resin sheet basic material, which has been rolled up while being pulled in the roll-up direction, at a certain dimension in the longitudinal direction of the resin sheet material 2 and cutting the cut resin sheet material 2 centrally in the lateral direction of the resin sheet, basic material. In this manner, the resin sheet material 2 is already stretched in the longitudinal direction when the resin sheet basic material is in the rolled-up state. In other words, the device for rolling up the resin sheet basic material while pulling the resin sheet basic material in the roll-up direction and the device for cutting the resin sheet basic material function as a unit for obtaining the resin sheet material 2 in a state of being stretched in the longitudinal direction.

The sheet supplying unit 4 includes a sheet transfer mechanism 41 for gripping one sheet of the resin sheet materials 2 stacked at the lower portion of the sheet supplying unit 4 and passing the sheet to the gripping device 3.

Figure 2:
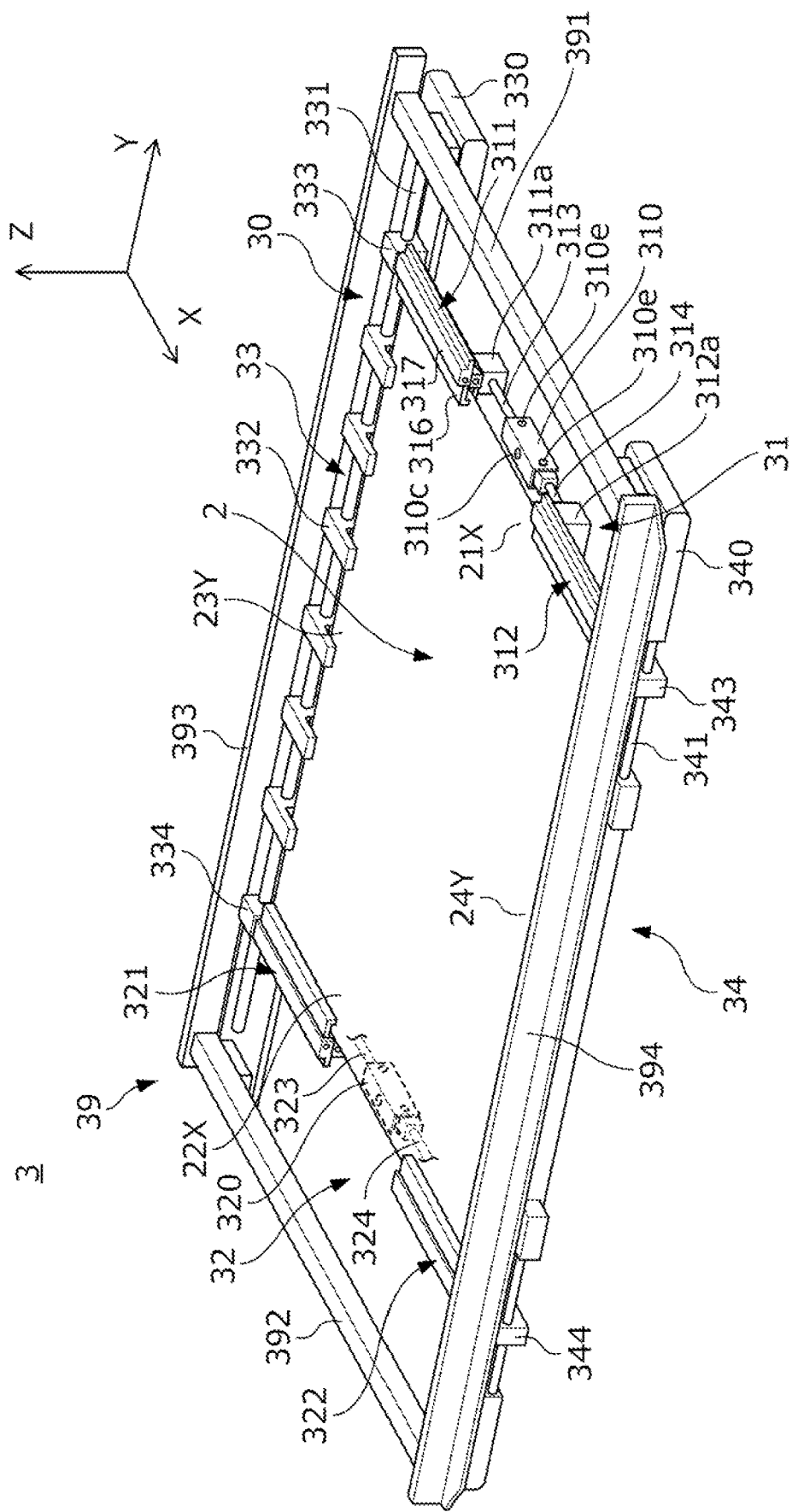
FIG. 2 is a perspective view illustrating a configuration of a gripping device.

FIG. 2 is a perspective view illustrating a configuration of the gripping device 3. As illustrated in FIG. 2, the gripping device 3 has a rectangular frame-like shape in a plan view. Hereinafter, the direction along the lateral direction of the gripping device 3 is defined as the X-axis direction, the direction orthogonal, to the X-axis direction and along the longitudinal direction of the gripping device 3 is defined as the Y-axis direction, and the direction orthogonal to the X-axis direction and the Y-axis direction is defined as the Z-axis direction.

The gripping device 3 includes a fixing frame 39 with a rectangular frame-like shape in a plan view and a gripping frame 30 for gripping the resin sheet material 2 with a rectangular frame-like shape smaller in size than the fixing frame 39 in a plan view.

The gripping frame 30 includes a first X side member 31 and a second X side member 32 that extend along a first X side end portion 21X and a second X side end portion 22X, respectively, on both sides in the Y-direction of the resin sheet material 2 and a first Y side member 33 and a second Y side member 34 that extend along a first Y side end portion 23Y and a second Y side end portion 24Y, respectively, on both sides in the X-direction of the resin sheet material 2. The first X side member 31 grips the first X side end portion 21X of the resin sheet material 2, the second X side member 32 grips the second X side end portion 22X of the resin sheet material 2, the first Y side member 33 grips the first Y side end portion 23Y of the resin sheet, material 2, and the second Y side member 34 grips the second Y side end portion 24Y of the resin sheet material 2. The four side end portions of the resin sheet material 2 are gripped by the gripping frame 30 in this manner.

The fixing frame 39 includes a first X frame member 391 that extends along the first X side end portion 21X of the resin sheet material 2, a second X frame member 392 that extends along the second X side end portion 22X of the resin sheet material 2, a first Y frame member 393 that extends along the first Y side end portion 23Y of the resin sheet material 2 and joins the end portions on the negative side in the X-direction of the first X frame member 391 and the second X frame member 392, and a second Y frame member 394 that extends along the second Y side end portion 24Y of the resin sheet material 2 and joins the end portions on the positive side in the X-direction of the first X frame member 391 and the second X frame member 392.

The first X side member 31 includes a first bending portion 310 where the tip portion of a first bending post 67, described below, makes contact; a first X end right clamp unit 311 provided on the negative side in the X-direction of the first bending portion 310, the first X end right clamp unit 311 being for gripping the first X side end portion 21X; a first X end left clamp unit 312 provided on the positive side in the X-direction of the first; bending portion 310, the first X end left clamp unit 312 being for gripping the first X side end portion 21X; a first right shaft 313 that joins the end portion on the positive side in the X-direction of the first bending portion 310 and the first X end right clamp unit 311; and a first left shaft 314 that joins the end portion on the negative side in the X-direction of the first bending portion 310 and the first X and left clump unit 312.

Figure 3:
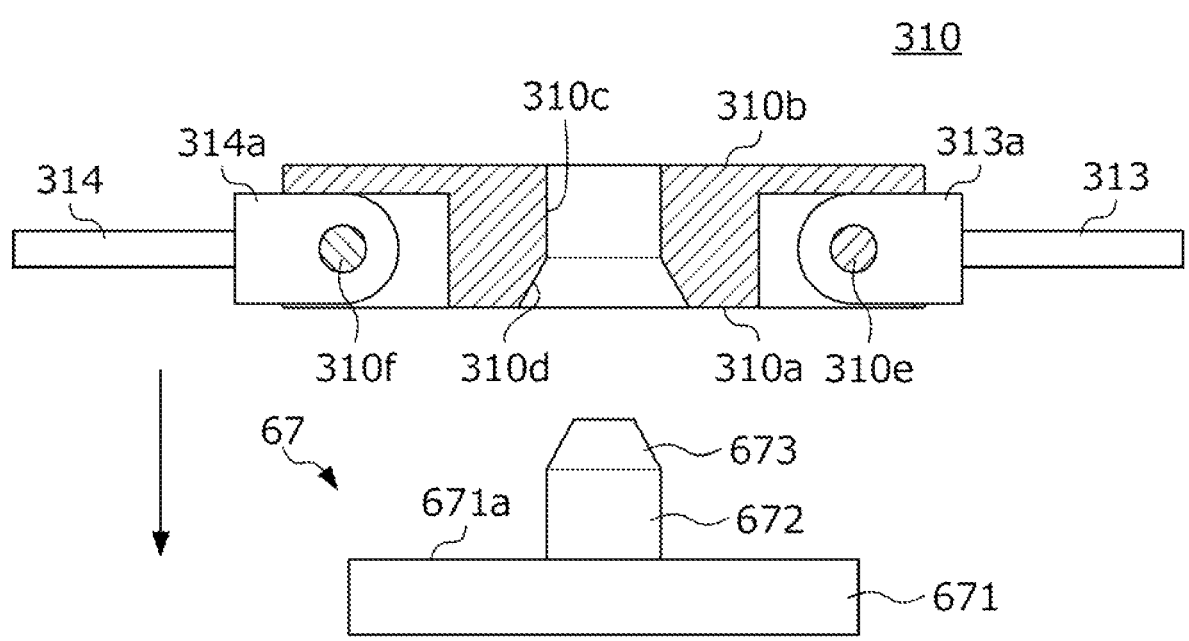
FIG. 3 is a cross-sectional view of a first bending portion of a first side member.

FIG. 3 is a cross-sectional view of the first bending portion 310. The first bending portion 310 is a column-like shape that extends in the X-direction. The lower surface along the Z-direction of the first bending portion 310 corresponds to a post contact surface 310a where the tip portion of the first bonding post 67, described below, makes contact; and the upper surface along the Z-direction corresponds to a sheet contact surface 310b where the resin sheet material 2 makes contact. Also, in a central portion of the first bending portion 310, a guide hole 310c is formed as a through-hole that extends along the Z-direction from the post contact surface 310a to the sheet contact surface 310b. A taper surface 310d is formed on the post contact surface 310a side of the guide hole 310c.

The end portions on both side in the X-direction of the first bending portion 310 are provided with a first right rotation shaft 310e and a first left rotation shaft 310f that extend along the Y-direction. The first right rotation shaft 310e supports a tip portion 313a of the first right shaft 313 in a manner allowing for free rotation, and the first left rotation shaft 310f supports a tip portion 314a of the first left shaft 314 in a manner allowing for free rotation. In this manner, the first X side member 31, at both end portions of the first bending portion 310, can freely bend about the first right rotation shaft 310e and the first left rotation shaft 310f.

Returning to FIG. 2, the first X end right clamp unit 311 has a rectangular shape that extends along the X-direction in a plan view. The end portion or the positive side in the X-direction of the first X end right clamp unit 311 is provided with a first right shaft support portion 311a that supports the base end portion of the first right shaft 313 in a manner allowing it to freely slide along the X-direction. In this manner, the distance in the X-direction between the first X end right clamp unit 311 and the first bending portion 310 can be adjusted by the first X end right clamp unit 311 sliding along the first right shaft 313.

Also, the end portion on the negative side in the X-direction of the first X end right clamp unit 311 is joined to the first Y side member 33 and a first support shaft 331 via a first X end clamp support portion 333 described below. In this manner, the end portion on the negative side in the X-direction of the first X end right clamp unit 311 can freely rotate about the first support shaft 331.

Figure 4A:
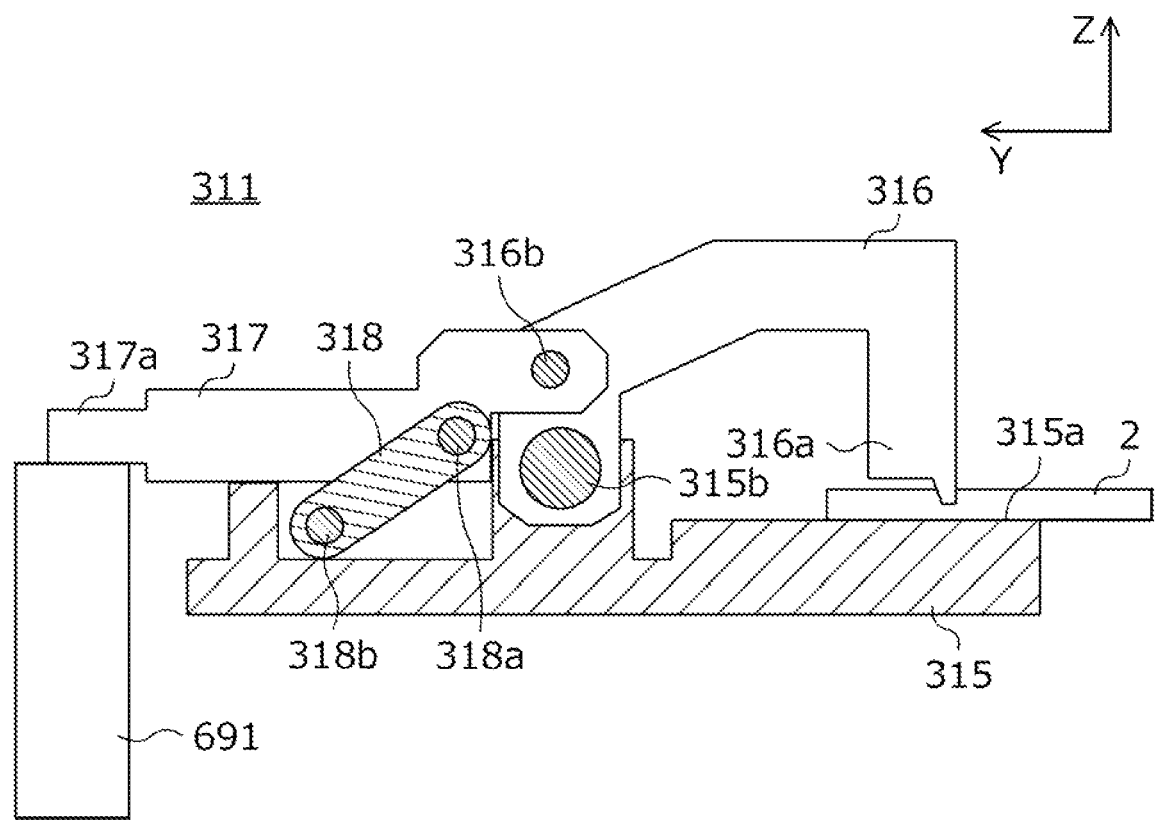
FIG. 4A is a partial cross-sectional view of a first X end right clamp unit of the first side member.
Figure 4B:
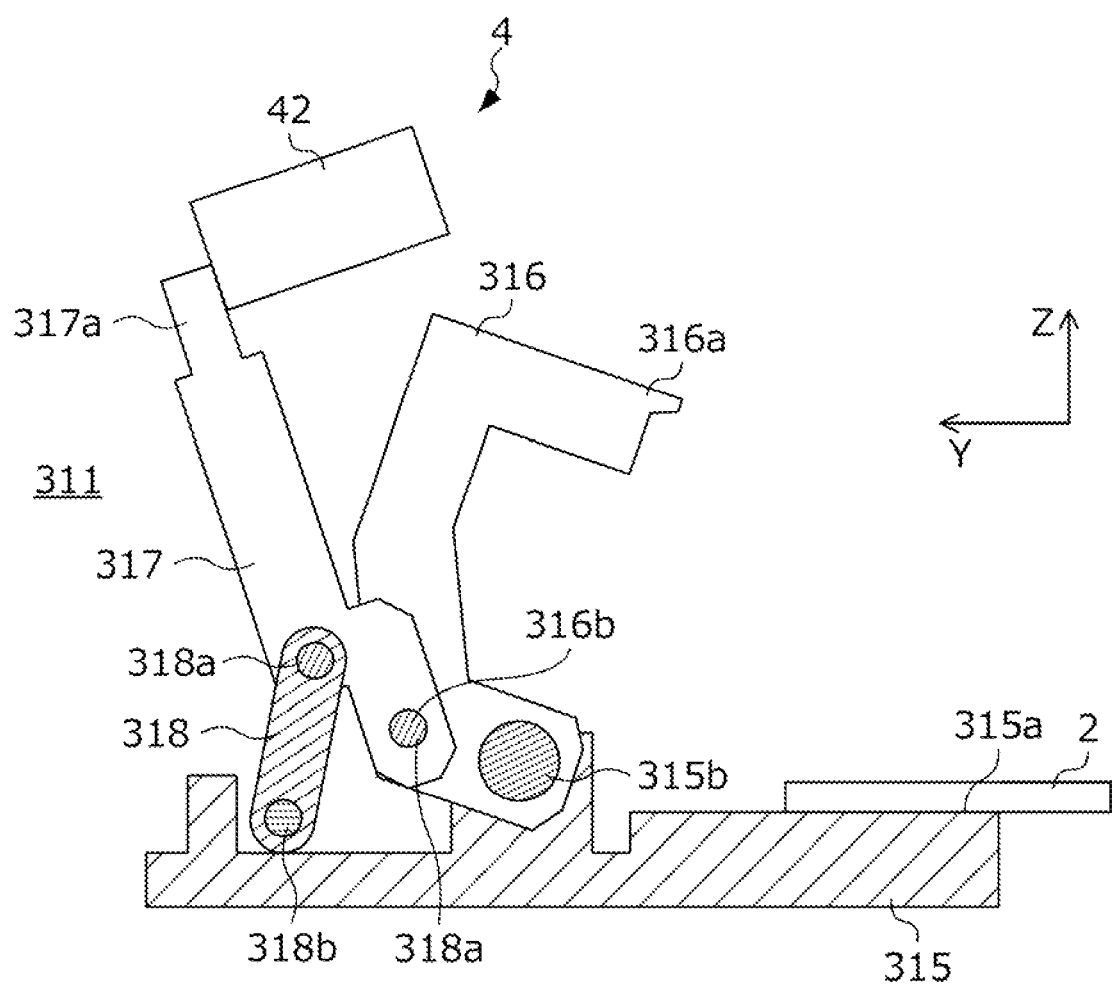
FIG. 4B is a partial cross-sectional view of the first X end right clamp unit of the first side member.

FIGS. 4A and 4B are partial cross-sectional views taken along the Y-direction of the first X end right clamp unit 311. The first X end right clamp unit 311 includes a clamp base portion 315, a clamp arm 316, a clamp lever 317, and a link 318.

The clamp base portion 315 extends along the Y-direction on the lower surface side of the resin shoot material 2. A contact surface 313a where the lower surface of the resin shoot material 2 makes contact is formed on the tip portion of the clamp base portion 315. The clamp arm 316 extends along the Y-direction on the upper surface side of the resin sheet material 2. A catch portion 316a where the upper surface of the resin sheet material 2 makes contact is provided on the tip portion of the clamp arm 316. Also, the base end portion of the clamp arm 316 is joined to the clamp base portion 315 via an open/close shaft 315b extending along the X-direction. Furthermore, an arm shaft 316b that extends along the X-direction is provided on the clamp arm 316 between the catch portion 316a and the open/close shaft 315b.

The clamp lever 317 extends along the Y-direction. The tip portion of the clamp lever 317 is joined to the clamp arm 316 via the arm shaft 316b described above. A first link shaft 318a and a second link shaft 318b that extend along the X-direction are provided at the two end portions of the link 318. The first link shaft 318a joins the base end portion of the link 318 and the clamp base portion 315 at a portion on the base end side of the open/close shaft 315b. The second link shaft 318b joins the tip portion of the link 318 and the clomp lever 317 at a portion between the arm shaft 316b and a base end portion 317a.

According to the first X end right clamp unit 311 with the configuration described above, when the base end portion 317a of the clamp lever 317 is pushed downward in the Z-direction by a clamp cylinder 42 provided on the sheet supplying unit 4, the edge portion of the resin sheet material 2 is pinched between the catch portion 316a of the clamp arm 316 and the contact surface 315a of the clamp base portion 315 (see FIG. 4B). In other words, when the base end portion 317a of the clamp lever 317 is pushed downward, the clamp lever 317 moves toward the catch portion 316a side, rotating counterclockwise about the second link shaft 318b. When the clamp lever 317 moves toward the catch portion 316a side, the clamp arm 316 rotates clockwise about, the open/close shaft 315b, bringing the catch portion 316a toward the contact surface 315a. In this manner, the end portion of the resin sheet material 2 is gripped by the first X end right clamp unit 311.

Also, according to the first X end right clamp unit 311 with the configuration described below, when the base end portion 317a of the clamp lever 317 is pushed upward in the Z-direction by a first right unclamp unit 691 described below, the catch portion 316a of the clamp arm 316 separates from the contact surface 315a of the clamp base portion 315, releasing the grip on the resin sheet material 2 (sew FIG. 4A). In other words, when the base end portion 317a of the clamp lever 317 is pushed upward, the clamp lever 317 moves toward the base end portion 317a side, rotating clockwise about the second link shaft 318b. When the clamp lever 317 moves toward the base end portion 317a side, the clamp arm 316 rotates counterclockwise about the open/close shaft 315b, separating the catch portion 316a from the contact surface 315a. In this manner, the grip of the first X end right clamp unit 311 on the resin sheet material 2 is released.

Returning to FIG. 2, the second X end clamp unit 312 has a rectangular shape that extends along the X-direction in a plan view. The end portion on the negative side in the X-direction of the second X end clamp unit 312 is provided with a first left shaft, support portion 312a that supports the base end portion of the first left shaft 314 in a manner allowing it to freely slide along the X-direction. In this manner, the distance in the X-direction between the first X end left clamp unit 312 and the first bending portion 310 can be adjusted by the first X end left clamp unit 312 sliding along the first left shaft 314.

Also, the end portion on the positive side in the X-direction of the first X end left clamp unit 312 is joined to the second Y side member 34 and a second support shaft 341 via a first X end clamp support portion 343 described below. In this manner, the end portion on the positive side in the X-direction of the first X end left clamp unit 312 can freely rotate about the second support shaft 341. Note that the first X end left clamp unit 312 has the same configuration as the first X end right clamp unit 311 described with reference to FIGS. 4A and 4B in terms of including a clamp base portion, a clamp arm, a clamp lever, and a link. As such, a detailed description of the configuration of the first X end left clamp unit 312 will be omitted.

The second X side member 32 includes a second bending portion 320 where the tip portion of a second bending post 68, described below, makes contact; a second X end left clamp unit 321 provided on the positive side in the X-direction of the second bending portion 320, the second X end left clamp unit 321 being for gripping the second X side end portion 22X; a second X end right clamp unit 322 provided on the negative side in the X-direction of the second bending portion 320, the second X end right clamp unit 322 being for gripping the second X side end portion 22X; a second left shaft 323 that joins the end portion on the positive side in the X-direction of the second bending portion 320 and the second X end left clamp unit 321; and a second right shaft 324 that joins the end portion on the negative side in the X-direction of the second bending portion 320 and the second X end right clamp unit 322.

The configurations of the second bending portion 320, the second X end left clamp unit 321, the second X end right clamp unit 322, the second left, shaft 323, and the second right shaft 324 are the same as the configurations of the first bending portion 310, the first X end right clamp unit 311, the first X end left clamp unit 312, the first right shaft 313, and the first left shaft 314 of the first X side member 31. As such, a detailed description thereof is omitted.

The first Y side member 33 includes a first base portion 330 that extends along the Y-direction, the first support shaft 331 that extends along the Y-direction and is supported by the first base portion 330, a plurality (six in the example illustrated in FIG. 2) of Y end clamps 332 provided on the first support shaft 331, the first X end clamp support portion 333 provided on the end portion on the positive side in the Y-direction of the first support shaft 331, and a second X end clamp support portion 334 provided on the end portion on the negative side in the Y-direction of the first support shaft 331.

The Y end clamps 332 each include a clamp pair that can open and close using the first support shaft 331 as a rotation shaft, with the first Y side end portion 23Y of the resin sheet material 2 being gripped by the clamp pair.

The first base portion 330 extends parallel with the first Y frame member 393 on the Z-direction lower side of the fixing frame 39. The end portion on the positive side in the Y-direction of the first base portion 330 is joined to an X-axis guide rail (not illustrated) provided on the lower surface side of the first X frame member 391, and the end portion on the negative side in the Y-direction of the first base portion 330 is joined to an X-axis guide rail (not illustrated) provided on the lower surface side of the second X frame member 392. In this manner, the first base portion 330 can freely slide in the X-direction along the fixing frame 39 via the X-axis guide rails provided on the X frame members 391, 392.

The first X end clamp support portion 333 supports the end portion on the negative side in the X-direction of the first X end right clamp unit 311 of the first X side member 31 in a manner allowing for free rotation about the first support shaft 331. Also, the first X end clamp support portion 333 is joined to a Y-axis guide rail (not illustrated) provided on the first base portion 330. In this manner, the first X side member 31 can freely slide in the Y-direction along the fixing frame 39 via the Y-axis guide rail provided on the first base portion 330.

The second X end clamp support portion 33A supports the end portion on the negative side in the X-direction of the second X end left clamp unit 321 of the second X side member 32 in a manner allowing for free rotation about the first support shaft 331. Also, the second X end clamp support portion 334 is joined to a Y-axis guide rail (not illustrated) provided on the first base portion 330. In this manner, the second X side member 32 can freely slide in the Y-direction along the fixing frame 39 via the Y-axis guide rail provided on the first base portion 330.

The second Y side member 34 includes a second base portion 340 that extends along the Y-direction, the second support shaft 341 that extends along the Y-direction and is supported by the second base portion 340, a plurality of Y end clamps (not illustrated) provided on the second support shaft 341, the first X end clamp support portion 343 provided on the end portion on the positive side in the Y-direction of the second support shaft 341, and a second X end clamp support, portion 344 provided on the end portion on the negative side in the Y-direction of the second support shaft 341.

In a similar manner to the plurality of Y and clamps 332 provided on the first Y side member 33, the plurality of Y end clamps provided on the second support shaft 341 each include a clamp pair that can open and close using the second support, shaft 341 as a rotation shaft, with the second Y side end portion 24Y of the resin sheet material 2 being gripped by the clomp pair.

The second base portion 340 extends parallel with the second Y frame member 394 on the Z-direction lower side of the fixing frame 39. The end portion on the positive side in the Y-direction of the second base portion 340 is joined to on X-axis guide rail (not illustrated) provided on the lower surface side of the first X frame member 391, and the end portion on the negative side in the Y-direction of the second base portion 340 is joined to an X-axis guide rail (not illustrated) provided on the lower surface side of the second X frame member 392. In this manner, the second base portion 340 can freely slide in the X-direction along the fixing frame 39 via the X-axis guide rails provided on the X frame members 391, 392.

The first X end clamp support portion 343 supports the end portion on the positive side in the X-direction of the first X end left clamp unit 312 of the first X side member 31 in a manner allowing for free rotation about the second support shaft 341. Also, the first X end clamp support portion 343 is joined to a Y-axis guide rail (not illustrated) provided on the second base portion 340. In this manner, the first X side member 31 can freely slide in the Y-direction along the fixing frame 39 via the Y-axis guide rail provided on the second base portion 340.

The second X end clamp support portion 344 supports the end portion on the positive side in the X-direction of the second X end right clamp unit 322 of the second X side member 32 in a manner allowing for free rotation about the second support shaft 341. Also, the second X end clamp support portion 344 is joined to a Y-axis guide rail (not illustrated) provided on the second base portion 340. In this manner, the second X side member 32 can freely slide in the Y-direction along the fixing frame 39 via the Y-axis guide rail provided on the second base portion 340.

Figure 5A:
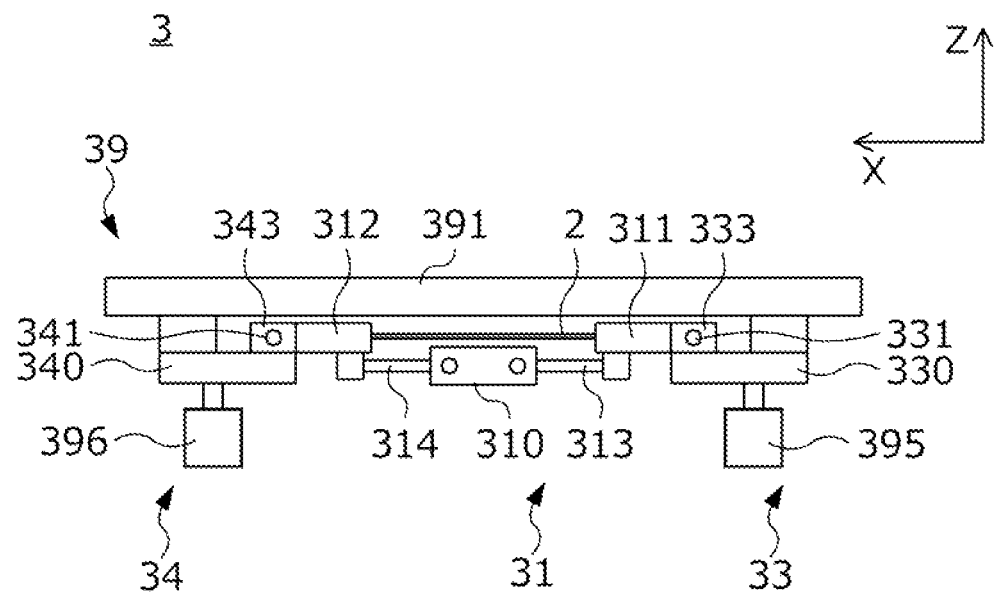
FIG. 5A is a diagram schematically illustrating the gripping device in a side view along the Y-direction as seen from a first X side member side.
Figure 5B:
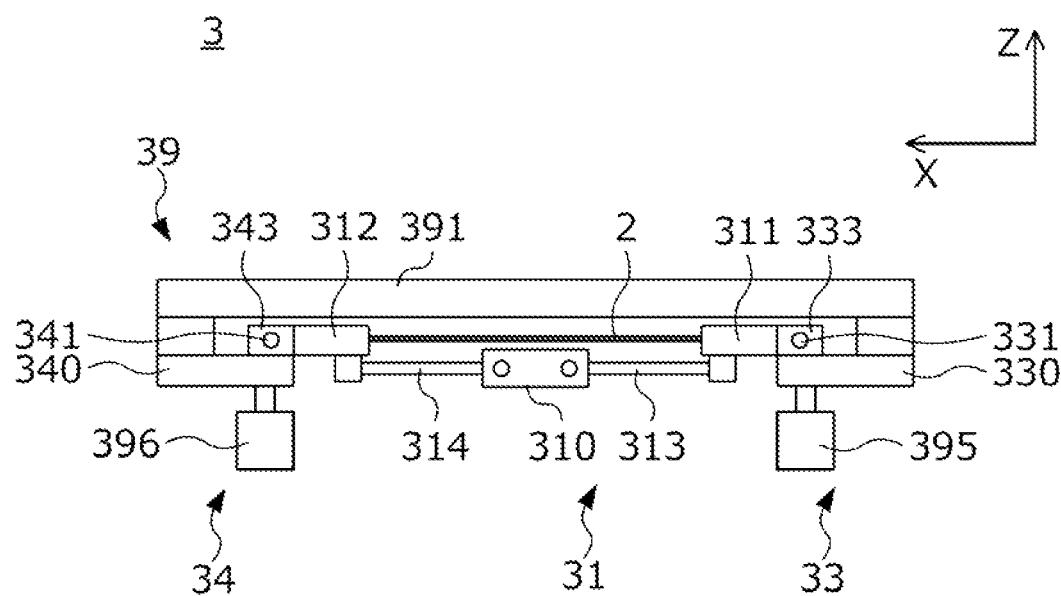
FIG. 5B is a diagram schematically illustrating the gripping device in a side view along the Y-direction as seen from the first X side member side.

FIGS. 5A and 5B are diagrams schematically illustrating the gripping device 3 in a side view along the Y-direction as seen from the first X side member 31 side. As described above, the end portion on the negative side in the X-direction of the first X end right clamp unit 311 of the first X side member 31 is joined to the first base portion 330 via the first X end clamp support portion 333 of the first Y side member 33. Also, the end portion on the positive side in the X-direction of the first X end left clamp unit 312 of the first X side member 31 is joined to the second base portion 340 via the first X end clamp support portion 343 of the second Y side member 34. Furthermore, the first base portion 330 and the second base portion 340 are joined by the X-axis guide rails provided on the first X frame member 391 of the fixing frame 39 and can freely slide in the X-direction along the fixing frame 39.

The fixing frame 39 includes a first X-axis actuator 395 for sliding the first base portion 330 along the X-axis guide rail and a second X-axis actuator 396 for sliding the second base portion 340 along the X-axis guide rail. Accordingly, in the gripping device 3, by driving the X-axis actuators 395, 396 end sliding the first base portion 330 toward the negative side in the X-direction and the second base portion 340 toward the positive side in the X-direction, as illustrated in FIG. 5B, the resin sheet material 2 gripped by the first X end right clamp unit 311 and the first X end left clamp unit 312 can be stretched in the X-direction. The configuration of the gripping device 3 on the second X side member 32 side is similar to that illustrated in FIGS. 5A and 5B, and thus illustration and a detailed description thereof is omitted.

Figure 6A:
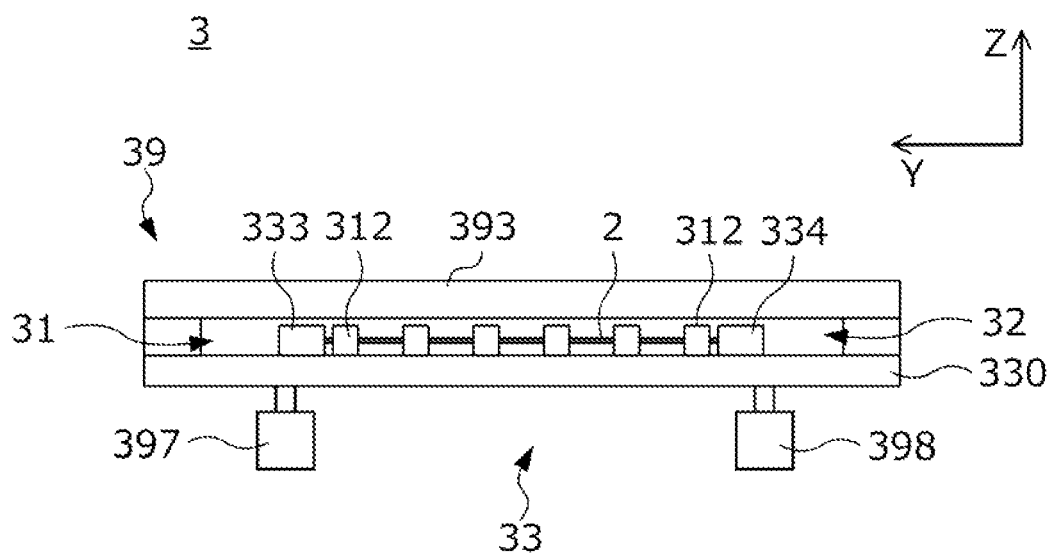
FIG. 6A is a diagram schematically illustrating the gripping device in a side view along the X-direction as seen from a first Y side member side.
Figure 6B:
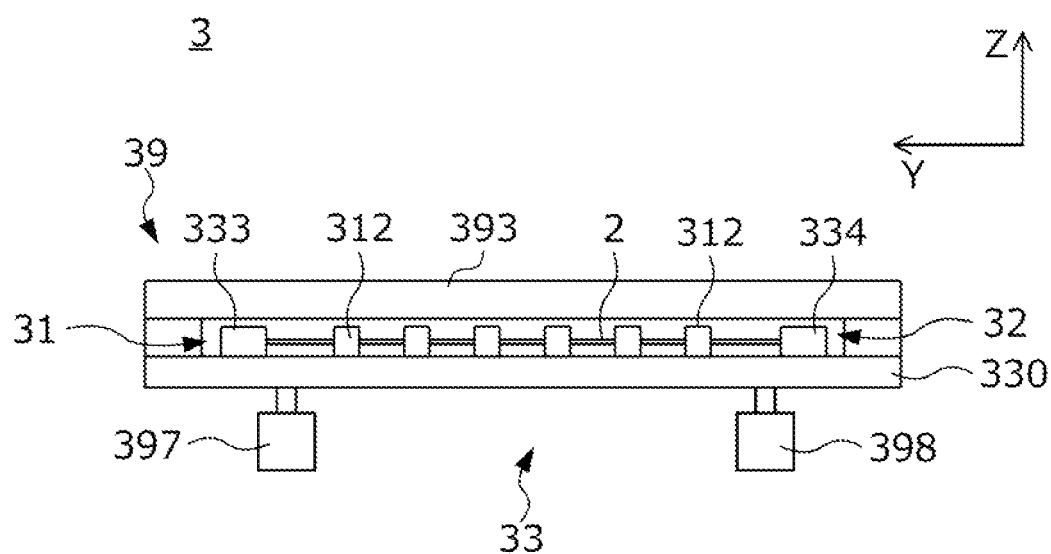
FIG. 6B is a diagram schematically illustrating the gripping device in a side view along the X-direction as seen from a first Y side member side.

FIGS. 6A and 6B are diagrams schematically illustrating the gripping device 3 in a side view along the X-direction as seen from the first Y side member 33 side. Note that in FIGS. 6A and 6B, to facilitate understanding, the first support shaft 331 is omitted. As described above, the first X end clamp support portion 333 of the first Y side member 33 is joined to the Y-axis guide rail provided on the first base portion 330. In this manner, the first X end clamp support portion 333 can freely slide in the Y-direction along the fixing frame 39 via the Y-axis guide rail provided on the first base portion 330. Also, the second X end clamp support portion 334 of the first Y side member 33 is joined to a Y-axis guide rail provided on the first base portion 330. In this manner, the second X end clamp support portion 334 can freely slide in the Y-axis along the fixing frame 39 via the Y-axis guide rail provided on the first base portion 330.

The fixing frame 39 includes a first Y-axis actuator 397 for sliding the first X end clamp support portion 333 along the Y-axis guide rail and a second Y-axis actuator 398 for sliding the second X end clamp support portion 334 along the Y-axis guide rail. Accordingly, in the gripping device 3, by driving the Y-axis actuators 397, 398 and sliding the first X end clamp support portion 333 toward the positive side in the y-direction and the second X end clamp support portion 334 toward the negative side in the Y-direction, as illustrated in FIG. 6B, the resin sheet material 2 gripped by the first X side member 31 and the second X side member 32 can be stretched in the Y-direction. The configuration of the gripping device 3 on the second Y side member 34 side is similar to that illustrated in FIGS. 6A and 6B, and thus illustration and a detailed description thereof is omitted.

Figure 7:
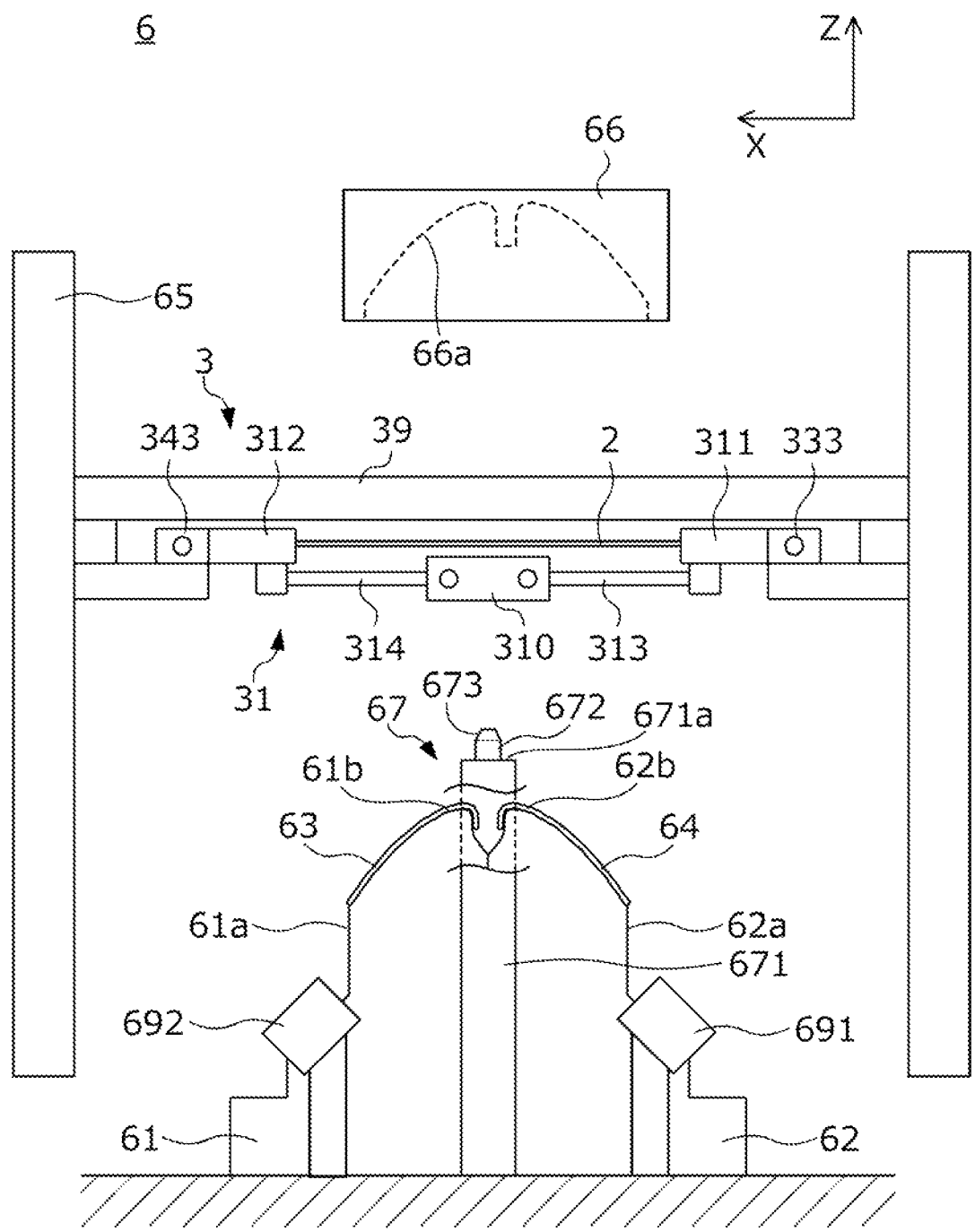
FIG. 7 is a diagram schematically illustrating a forming device in a side view along the Y-direction as seen from the first X side member side of the gripping device.
Figure 8:
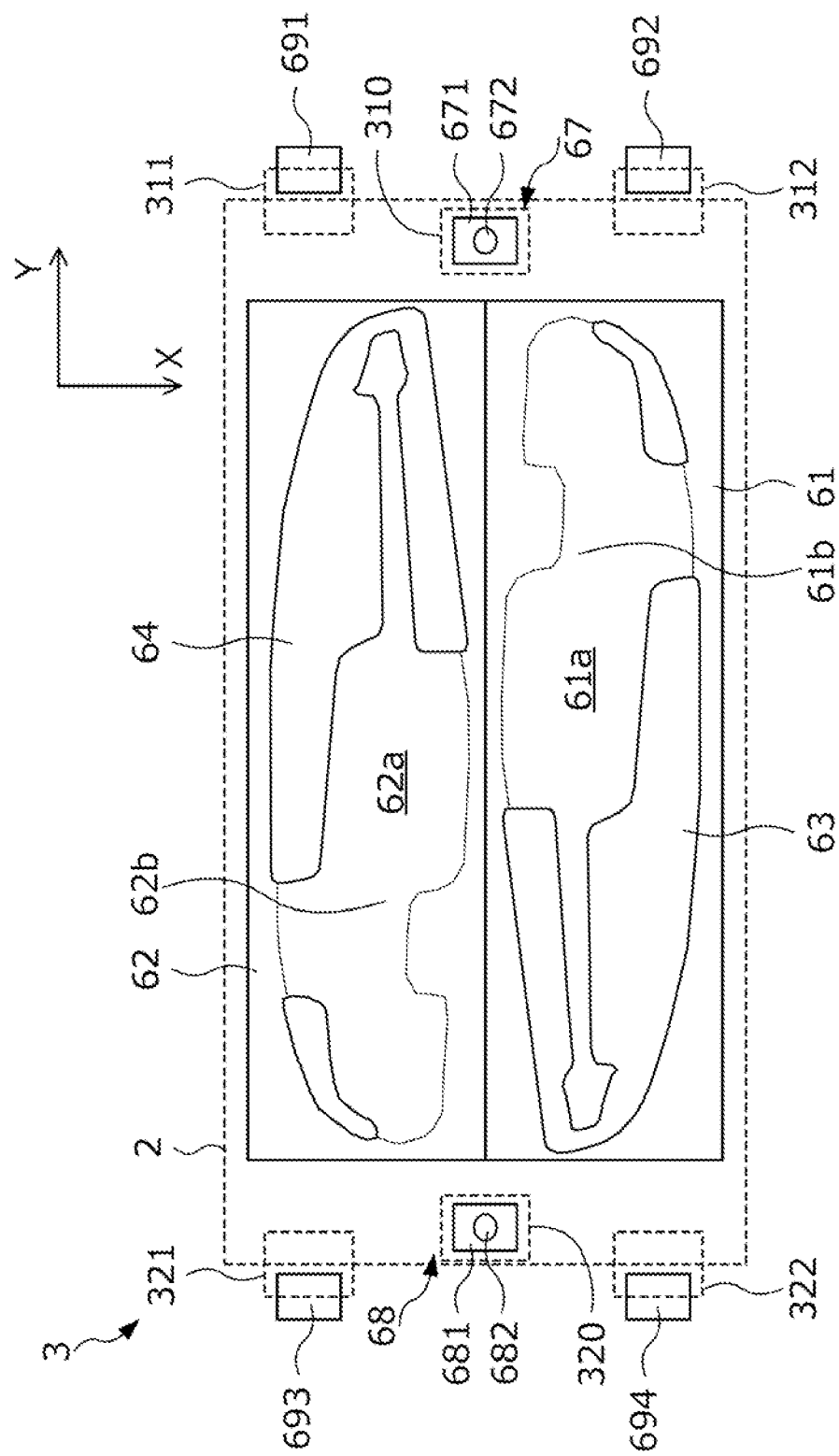
FIG. 8 is a diagram schematically illustrating the forming device in a plan view along the Z-direction as seen from above.

Next, the configuration of the forming device 6 will be described with reference to FIGS. 7 to 9. FIG. 7 is a diagram schematically illustrating the forming device 6 in a side view along the Y-direction as seen from the first X side member 31 side of the gripping device 3. FIG. 8 is a diagram schematically illustrating the forming device 6 in a plan view along the Z-direction as seen from above. Note that in FIG. 8, the resin sheet, material 2 gripped by the gripping frame of the gripping device 3, the bending portions 310, 320, which ore components of the gripping frame, and the first X end right clamp units 311, 321 and the first X end left clamp units 312, 322 for gripping the resin sheet material 2 are illustrated with a dashed line.

The forming device 6 includes a first lower die 61 and a second lower die 62, a first base material 63 placed on a first lower die surface 61a of the first lower die 61, a second base material 64 placed on a second lower die surface 62a of the second lower die 62, a lowering device 65 for lowering the gripping device 3 along the Z-direction and bringing the resin sheet material gripped by the gripping device 3 toward the lower, dies 61, 62, an upper die 66 provided above the lower dies 61, 62 on the other side of the resin sheet material 2, the first bending post 67 and the second bending post 68 provided on both sides in the Y-direction of the lower die surfaces 61a, 62a, the first right unclamp unit 691 and the first left unclamp unit 692 provided on the positive side in the Y-direction of the lower die surfaces 61a, 62a, and a second left unclamp unit 693 and a second right unclamp unit 694 provided on the negative, side in the Y-direction of the lower die surfaces 61a, 62a.

As illustrated in FIG. 7, the first lower die surface 61a of the first lower die 61 includes a first protrusion surface 61b that protrudes upward along the Y-direction in a side view. Also, the second lower die surface 62a of the second lower die 62 includes a second protrusion surface 62b that protrudes upward along the Y-direction in a side view. As illustrated in FIG. 6, the first lower die surface 61a and the second lower die surface 62a have the same shape and are provided back-to-back in a plan view. Thus, the lower die including the first lower die 61 and the second lower die 62 has an overall shape that protrudes upward along the Y-direction in a side view. A suction device, not-illustrated, is connected to the first lower die surface 61a and the second lower die surface 62a, enabling a gas to be sectioned from the lower die surfaces 61a, 62a.

Also, the first base material 63 placed on the first lower die surface 61a and the second base material 64 placed on the second lower die surface 62a have the same shape and are provided back-to-back in a plan view. Thus, in the forming device 6, the resin shoot materiel 2 can be adhered to the two base materials 63, 64 at the same time.

The upper die 66 includes an upper die surface 66a corresponding to the first lower die surface 61a and the second lower die surface 62a. The upper die 66 can be raised and lowered along the Z-direction by a raising and lowering mechanism, not illustrated. Also, a suction device, not illustrated, is connected to the upper die surface 66a, enabling a gas to be auctioned from the upper die surface 66a.

The lowering device 65 is provided between the lower dies 61, 62 and the upper die 66. The lowering device 65 lowers the gripping device 3 along the Z-direction via a driving force generated by a hydraulic cylinder, an electromagnetic actuator, or the like and brings the resin sheet material gripped by the gripping frame 30 toward the lower dies 61, 62. Note that at this time, the lowering device 65 preferably only grips the fixing frame 39 of the gripping device 3. This allows the gripping frame 30 to be deformed while the gripping device 3 is being lowered.

The first bending post 67 includes a first column member 671 erected near the lower dies 61, 62 that extends along the Z-direction and a first bending post pin 672 provided on the tip portion of the first column member 671. As illustrated in FIG. 3, the outer diameter of the first bending post pin 672 is slightly less than the inner diameter of the guide hole 310c of the first bending portion 310. Also, the tip portion of the first bending post pin 672 is formed as a tapered surface 673 that decreases in diameter from the base end toward the tip. In this manner, by bringing the first bending portion 310 toward the tip portion of the first bending post 67, the first bending post pin 672 is inserted into the guide hole 310c of the first bending portion 310, and, while aligning the first bending portion 310 with the first bending post 67, the post contact surface 310a of the first bending portion 310 can be brought into contact with a tip surface 671a of the first column member 671. Also, as illustrated in FIG. 7, the height in the Z-direction of the tip surface 671a of the first bending post 67 is greater than the height of the protrusion surfaces 61b, 62b described above, in other words, the tip surface 671a of the first bending post 67 is provided higher up than the protrusion surfaces 61b, 62b. Note that though drawings and a detailed description are omitted, the second bending post 68 includes a second column member 681 and a second bending post pin 682 with the same configuration as the first column member 671 and the first bending post pin 672 described above.

As illustrated in FIG. 8, in a plan view, the first bending post 67 is provided between the first lower die surface 61a and the second lower die surface 62a on the positive side in the Y-direction of the lower die surfaces 61a, 62a. Also, in a plan view, the second bending post 68 is provided between the first lower die surface 61a and the second lower die surface 62a on the negative side in the Y-direction of the lower die surfaces 61a, 62a. The first bending post 67 and the second bending post 68 are provided at positions opposing one another in the X-direction on either side of the lower die surfaces 61a, 62a in a plan view. Also, the first bending post 67 is provided on the lower side in the Z-direction of the first bending portion 310, which is a portion of the gripping frame for gripping the resin sheet material 2, and the second bending post 68 is provided on the lower side in the Z-direction of the second bending portion 320, which is a portion of the gripping frame. In this manner, by lowering the gripping device 3 in the Z-direction via the lowering device 65, the bonding portions 310, 320 can be brought into contact with the bonding posts 67, 68 before the resin sheet material 2 comes into contact with the lower die surfaces 61a, 62a. Then, after the bending portions 310, 320 have come into contact with the bending posts 67, 68, by further lowering the fixing frame 39 of the gripping device 3 via the lowering device 65, the gripping frame 30 can be bent to protrude upward in a side view along the Y-direction by the bending posts 67, 68.

Figure 9:
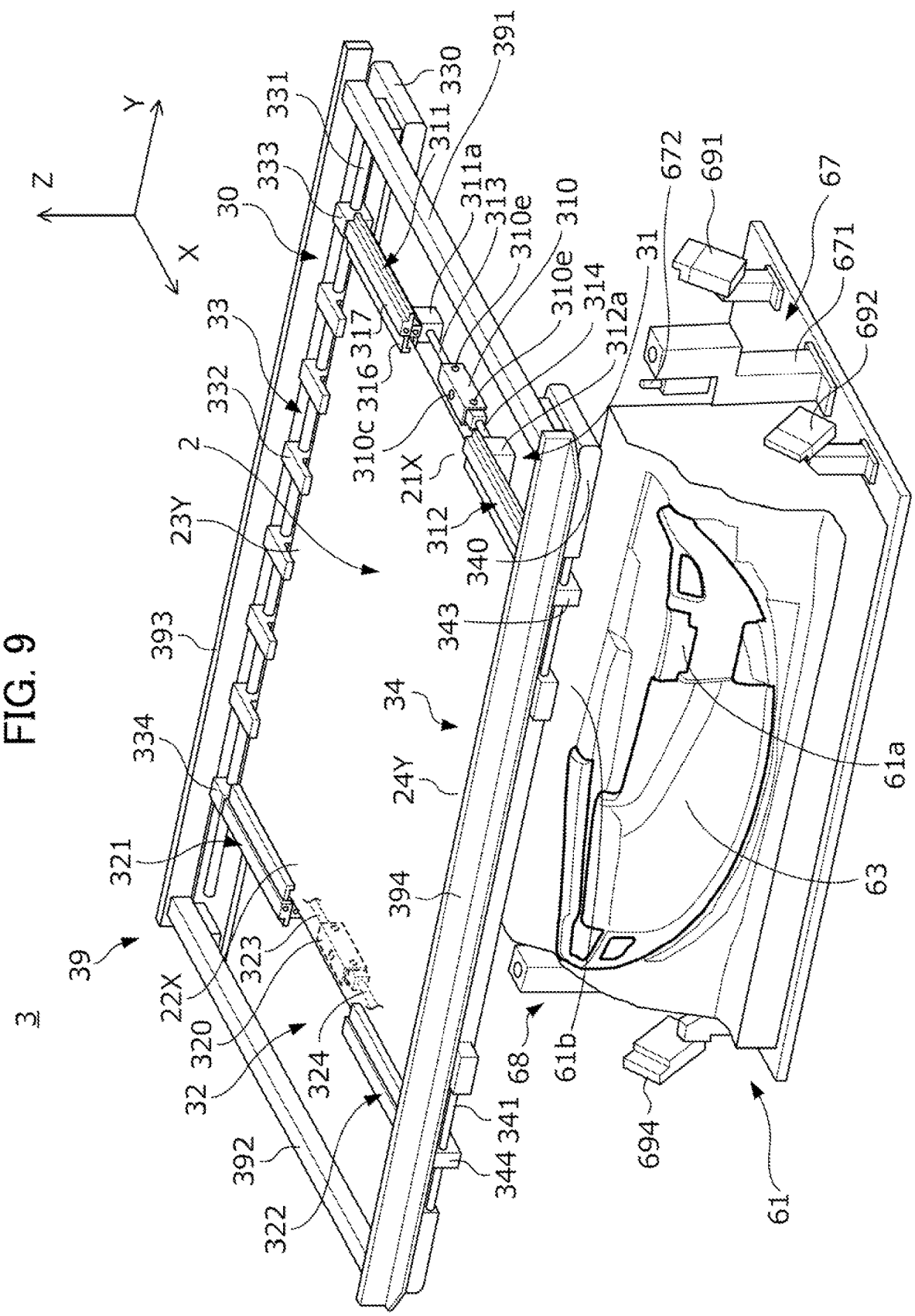
FIG. 9 is a perspective view of a first lower die and the gripping device.

FIG. 9 is a perspective view of the first lower die 61 and the gripping device 3. Note that in FIG. 9, to facilitate understanding, the second lower die 62 is omitted. As illustrated in FIGS. 8 and 9, the first right unclamp unit 691 and the first left unclamp unit 692 are provided on the positive side in the Y-direction of the lower die surfaces 61a, 62a, respectively, and the second left unclamp unit 693 and the second right unclamp unit 694 are provided on the negative side in the Y-direction of the lower die surfaces 61a, 62a, respectively. The first right unclamp unit 691 is provided further to the negative side in the X-direction than the first bonding post 67, and the first left unclamp unit 692 is provided further to the positive side in the X-direction than the first bending post 67. The second left unclamp unit 693 is provided further to the negative side in the X-direction than the second bending post 68, and the second right unclamp unit 694 is provided further to the positive side in the X-direction than the second bending post 68.

As illustrated in FIG. 8, in a plan view, the first right unclamp unit 691 is provided on the lower side in the Z-direction of the first X end right clamp unit 311 of the gripping frame and comes to face the first X end right clamp unit 311 when the gripping device 3 is lowered as described below. In a plan view, the first left unclamp unit 692 is provided on the lower side in the Z-direction of the first X end left clamp unit 312 of the gripping frame and comes to face the first X end left clamp unit 312 when the gripping device 3 is lowered. In a plan view, the second left unclamp unit 693 is provided on the lower side in the Z-direction of the second X end left clamp unit 321 of the gripping frame and comes to face the second X end left clamp unit 321 when the gripping device 3 is lowered as described below. In a plan view, the second right unclamp unit 694 is provided on the lower side in the Z-direction of the second X end right clamp unit 322 of the gripping frame and comes to face the second X end right clamp unit 322 when the gripping device 3 is lowered as described below. By the base end portions of the clamp levers of the clamp units 311, 312, 321, 322 disposed opposing the unclamp units 691, 692, 693, 694 being pushed upward in the Z-direction when the gripping device 3 is lowered, the grip of the clamp units 311, 312, 321, 322 on the resin sheet material 2 is released (see FIG. 4A described above).

Next, the process of a resin forming method using the resin forming system 1 described above will be described.

Figure 10:
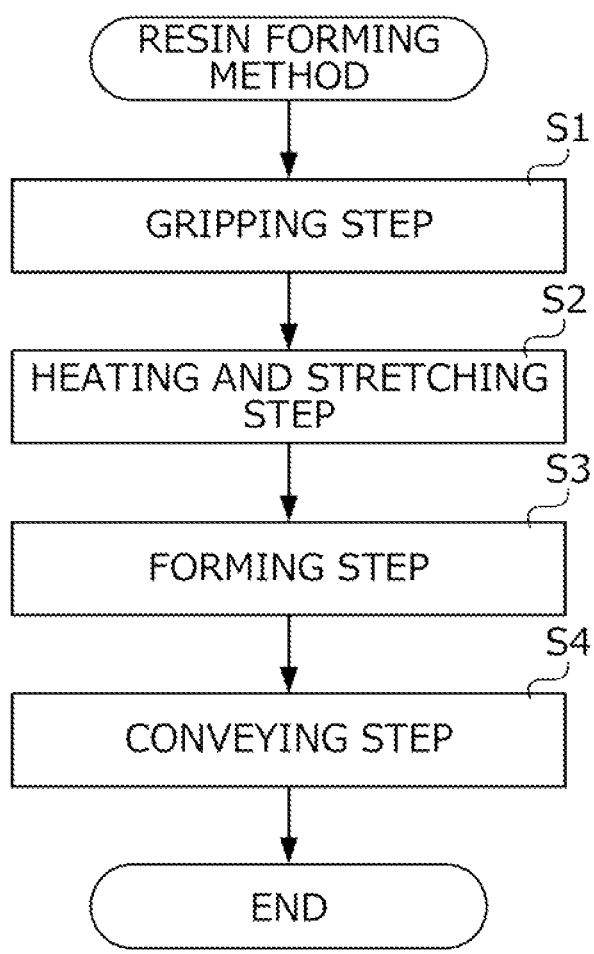
FIG. 10 is a flowchart illustrating a detailed process of a resin forming method according to the present embodiment.

FIG. 10 is a flowchart illustrating a detailed process of a resin forming method. First, in a gripping step S1, the sheet supplying unit 4 uses the sheet transfer mechanism 41 to make the gripping frame 30 of the gripping device 3 grip one new sheet of the resin sheet material 2 and then conveys the gripping device 3 to the heating device 5. Specifically, the Y side end portions 23Y, 24Y of the resin sheet material 2 are gripped by the Y end clamps of the Y side members 33, 34 of the gripping frame 30, and the X side end portions 21X, 22X of the resin sheet material 2 are gripped by the clamp units 311, 312 of the first X side member 31 of the gripping frame 30 and the clamp units 321, 322 of the second X side member 32. As described with reference to FIG. 4B, the sheet supplying unit 4 is provided with the clamp cylinder 42. Here, in the gripping step S1, by the base end portions of the clamp levers of the clamp units 311, 312, 321, 322 being pushed downward in the Z-direction by the clamp cylinders 42, the resin sheet material 2 is gripped by the clamp units 311, 312, 321, 322.

Next, in a heating and stretching step 32, the heating device 5 heats and stretches the resin sheet material 2 gripped by the gripping frame 30 of the gripping device 3. Also, in the heating and stretching step S2, by the gripping device 3 driving the X-axis actuators 395, 396 and the Y-axis actuators 397, 398, the resin sheet material 2 softened by heating via the heating device 5 is stretched in the X-direction and the Y-direction (see FIGS. 5A and 5B and FIGS. 6A and 6B described above), and then the gripping device 3 is conveyed to the forming device 6.

Next, in a forming step S3, the lower dies 61, 62 and the upper die 66 provided sandwiching the resin sheet material 2 after the heating and stretching step S2 are clamped together, the resin sheet; materiel 2 is adhered to the base materials 63, 64 as a skin, and a product is manufactured. Specifically, in the forming step S3, the gripping device 3 after the heating and stretching step S2 lowered downward in the Z-direction by the lowering device 65, and the resin sheet material 2 gripped by the gripping frame 30 is brought toward the lower dies 61, 62. Thereafter, the lower dies 61, 62 and the upper die 66 are clamped together, and a suction device, not; illustrated, is used to suction a gas from the lower die surfaces 61a, 62a and the upper die surface 66a. This adheres the resin sheet material 2 to the base materials 63, 64.

Figure 11:
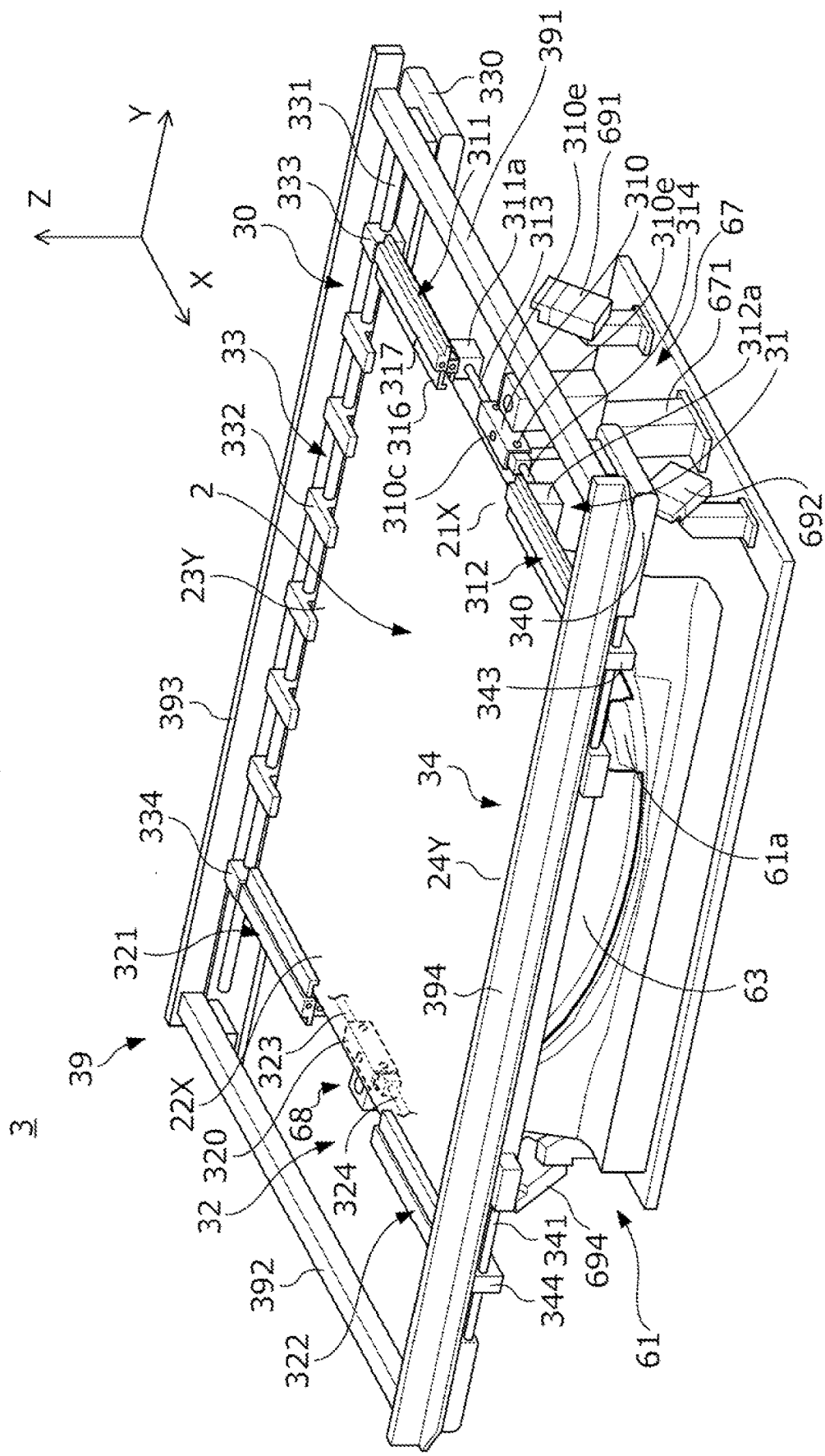
FIG. 11 is a diagram illustrating the process of lowering the gripping device in a forming step (1 of 2)
Figure 12:
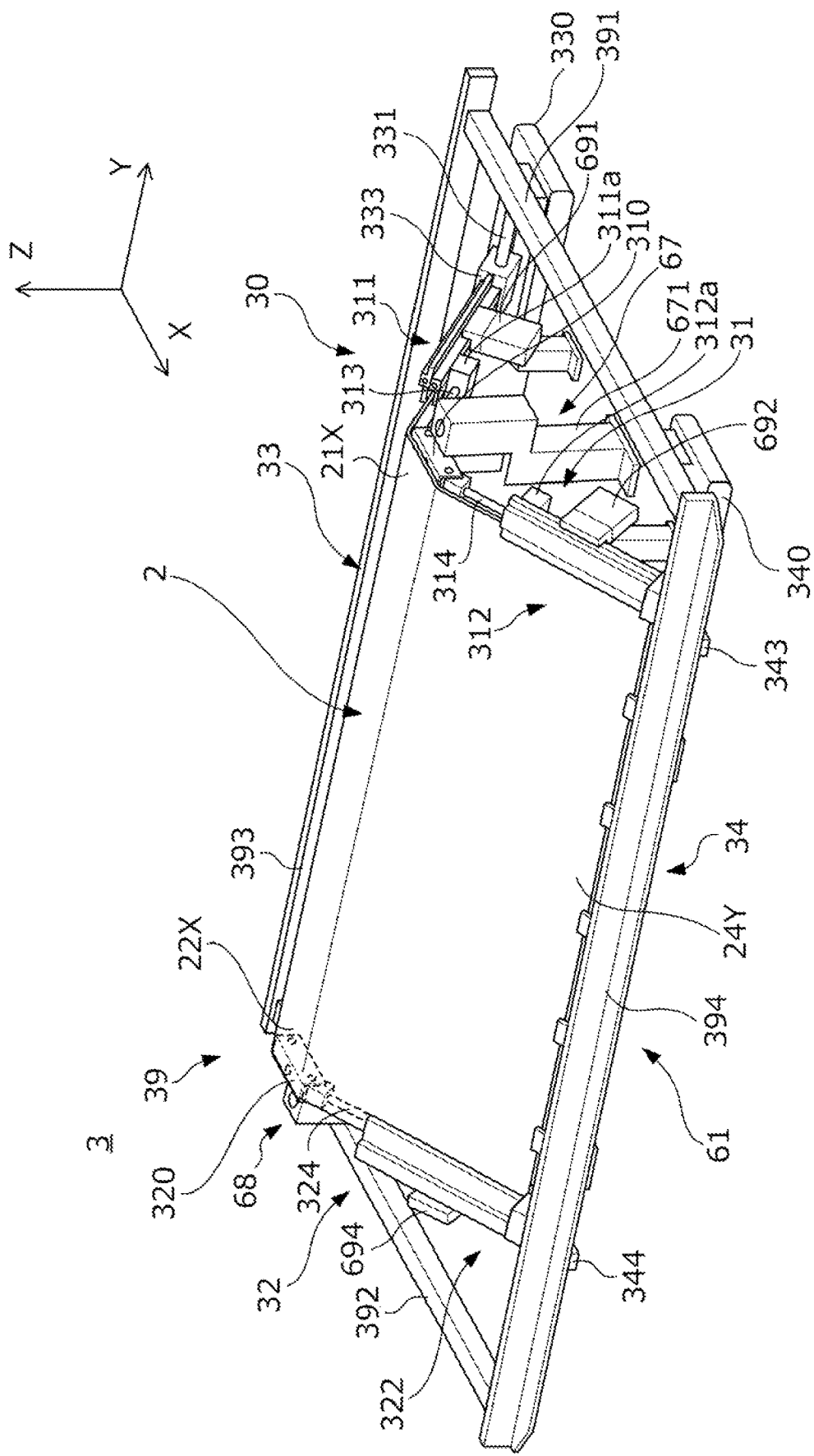
FIG. 12 is a diagram illustrating the process of lowering the gripping device in a forming step (2 of 2)

Next, the process of lowering the gripping device 3 in the forming step S3 will be described in detail with reference to FIGS. 9, 11, and 12. FIGS. 11 and 12 are diagrams illustrating a process of lowering the gripping device 3. Note that also in FIGS. 11 and 12, to facilitate understanding, the second lower die 62 is omitted.

In the forming step S3, a conveying device, not illustrated, conveys the gripping device 3 to the upper side of the lower dies 61, 62 in the Z-direction as illustrated in FIG. 9.

Next, as illustrated in FIG. 11, the lowering device 65 lowers the fixing frame 39 of the gripping device 3 downward in the Z-direction until the bending portions 310, 320 of the gripping frame 30 come into contact with the tip portions of the bending pests 67, 68. Specifically, the lowering device 65 lowers the fixing frame 39 in the Z-direction until the bending post pins 672, 682 provided on the tip portions of the bending poets 67, 68 are inserted into the guide holes formed in the bending portions 310, 320 and until the post contact surfaces of the bending portions 310, 320 come into contact with the tip surface of the bending posts 67, 68.

Note that as described with reference to FIG. 3, the guide holes of the bending portions 310, 320 and the bending post pins 672, 682 are formed with a tapered surface. Thus, even in a case where the position of the gripping device 3 in relation to the bending posts 67, 68 or the lower dies 61, 62 is offset from the correct position, the gripping device 3 can be positioned at the correct position, allowing the bending portions 310, 320 to be inserted on the bending post pins 672, 682. In this manner, by the gripping device 3 being aligned in relation to the bonding posts 67, 68 and the lower dies 61, 62, the resin sheet material 2 gripped by the gripping frame 30 of the gripping device 3 can be adhered on the base materials 63, 64 placed in the lower dies 61, 62 consistently at the same position, improving the quality of the product.

Next, as illustrated in FIG. 12, the lowering device 65 lowers the fixing frame 39 of the gripping device 3 further downward in the Z-direction. As described with reference to FIG. 3, the first X side member 31 and the second X side member 32 of the gripping frame 30 can freely bend at ends on both sides in the X-direction of the bending portions 310, 320. Thus, after the bending portions 310, 320 have come into contact with the tip portion of the bonding poets 67, 68 and the fixing frame 39 is further lowered, as illustrated in FIG. 12, the first X side member 31 and the second X side member 32 bend at ends on both sides of the bending portions 310, 320.

Also, as described with reference to FIGS. 5A and 5B, the first base portion 330 and the second base portion 340 to which the first X side member 31 and the second X side member 32 are joined at both end portions can freely slide in the X-direction along the fixing frame 39. Thus, when the fixing frame 39 of the gripping device 3 is lowered by the lowering device 65, the first base portion 330 and the second base portion 340 slide toward one another in the X-direction via the tension of the resin sheet material 2. Then, as illustrated in FIG. 12, the first X side member 31 and the second X side member 32 bend at both sides of the bending portions 310, 320 and protrude upward as seen along the Y-direction.

Also, when the fixing frame 39 is lowered in this manner, the central portion in the X-direction of the X side end portions 21X, 22X of the resin sheet material 2 gripped by the side members 31, 32 are brought into contact with the sheet contact surface of the bending portions 310, 320. This also bonds the resin sheet material 2 at the ends on both sides of the bending portions 310, 320, making it protrude upward as seen along the Y-direction. In this manner, in the forming stop S3, simply by lowering the fixing frame 39 of the gripping device 3 via the lowering device 65, the resin sheet material 2 can be bent in a shape corresponding to the protrusion shape of the lower die surfaces 61a, 62a.

Accordingly, in the present invention, by bending the gripping frame 30 gripping the four side end portions 21X, 22X, 23Y, 24Y of the planar-shaped resin sheet material 2, the resin sheet materiel 2 is bent to protrude upward. This allows the resin sheet material 2 to be stretched uniformly at all portions in the planar direction and allows the thickness of the resin sheet material 2 at all portions to be made uniform. This further improves the quality of the product.

Also, in the forming step S3, after the resin shoot material 2 is brought toward the lower dies 61, 62 in this manner, the lower dies 61, 62 and the upper die 66 are clamped together, and a suction device, not illustrated, is used to suction a gas from the lower die surfaces 61a, 62a and the upper die surface 66a. This adheres the resin sheet material 2 to the base materials 63, 64.

Note that as illustrated in FIG. 12, when the fixing frame 39 is lowered by the lowering device 65, the clamp units 311, 312 for gripping the first X side end portion 21X of the resin sheet; material 2 and the clamp units 321, 322 for gripping the second X side end portion 22X are disposed opposing the unclamp units 691, 692, 693, 694. Thus, in the forming step S3, after the resin sheet material 2 is adhered to the base materials 63, 64 via the process described above, the clamp levers of the clamp units 311, 312, 321, 322 are pushed upward in the Z-direction by the unclamp units 691, 692, 693, 694, releasing the grip of the clamp units 311, 312, 321, 322 on the resin sheet materiel 2.

In this manner, in the present invention, by the unclamp units 691 to 694 for releasing the grip of the gripping device 3 on the resin shoot material 2 being provided near the lower dies 61, 62 as a separate member to the gripping device 3, the unclamp units 691 to 694 can be kept at normal temperatures at all times. In other words, it is conceivable to provide the unclamp units on the gripping device 3. However, in this case, the gripping device 3 is heated by the heating device 5 along with the resin shoot material 2. In contrast, according to the present invention, the unclamp units 691 to 694 can be kept at normal temperatures at all times as described above. Thus, the unclamp units 691 to 694 can be prevented from damage and deformation due to heat.

Returning to FIG. 10, in a conveying step S4, a conveying device, not illustrated, conveys the gripping device 3, after the forming step S3, from the forming device 6 to the sheet supplying unit 4. Specifically, in the conveying step S4, the conveying device returns the gripping frame 30 having stretched out in the X-direction end the Y-direction in the heating and stretching step S2 to its original position and conveys the gripping device 3 to the sheet supplying unit 4.

Note that in the embodiment described above, the pair of bending posts 67, 68 erected neat; the lower dies 61, 62 are used as the pair of bending support portions where the first bending portion 310 and the second bending portion 320 of the gripping frame 30 of the gripping device 3 make contact. However, the present invention is not limited to this configuration. As the pair of bending support portions that bend the gripping frame 30 when the pair of bending portions 310, 320 of the gripping frame 30 come into contact, for example, a portion of the lower dies may be used, or a portion of a device separate from the forming device may be used.

Second Embodiment

Next, a configuration of a resin forming system 1A according to the second embodiment of the present invention will be described with reference to the drawings. Note that in the following description of the resin forming system 1A, configurations that are the same as that of the resin forming system 1 according to the first embodiment are given the same reference sign and detailed descriptions thereof are omitted.

Figure 13:
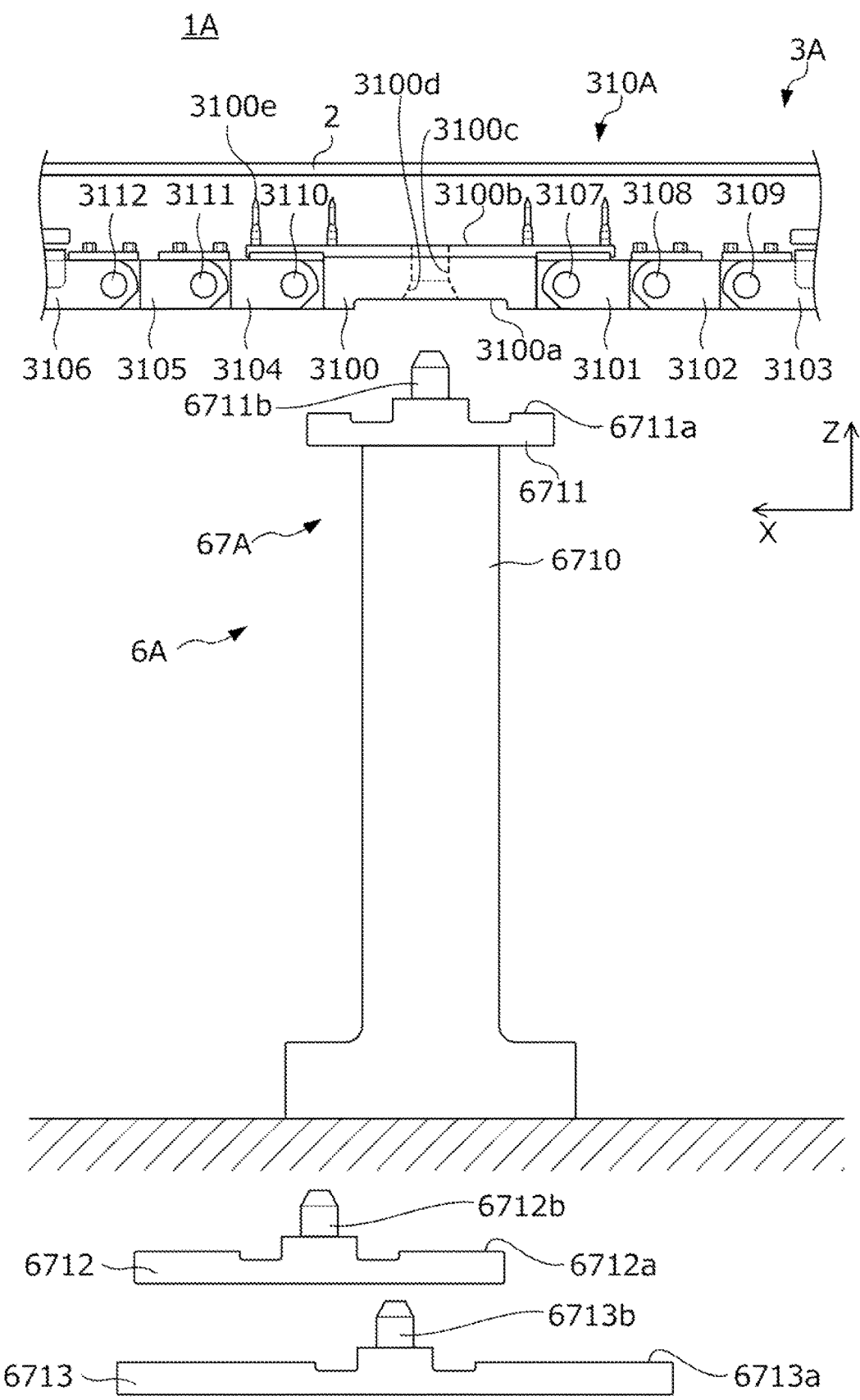
FIG. 13 is a diagram illustrating the configuration of the resin forming system according to a second embodiment of the present invention.

FIG. 13 is a diagram illustrating the configuration of the resin forming system 1A according to the present embodiment. The resin forming system 1A is different from the resin forming system 1 in that the configuration of a gripping device 3A and a forming device 6A are different. Specifically, a first bending portion 310A and a second bending portion (not illustrated) of the gripping device 3A and a first bending post 67A and a second bending post (not illustrated) of the forming device 6A have different configurations from that in the resin forming system 1.

The first bending portion 310A includes a central joint member 3100 with a column-like shape that extends in the X-direction, a plurality (three in the example of FIG. 13) of right joint members 3101, 3102, 3103 that extend in the X-direction, a plurality (three in the example of FIG. 13) of left joint members 3104, 3105, 3106 that extend in the X-direction, a plurality (three in the example of FIG. 13) of right rotation shafts 3107, 3108, 3109 that extend in the Y-direction, and a plurality (three in the example of FIG. 13) of left rotation shafts 3110, 3111, 3112 that extend in the Y-direction.

The end portion on the positive side in the X-direction of the first right joint member 3101 is supported in a manner allowing for free rotation by the first right rotation shaft 3107 provided on the end portion of the negative side in the X-direction of the central joint member 3100. The end portion on the positive side in the X-direction of the second right joint member 3102 is supported in a manner allowing for free rotation by the second right rotation shaft 3108 provided on the end portion of the negative side in the X-direction of the first right joint member 3101. The end portion on the positive side in the X-direction of the third right joint member 3103 is supported in a manner allowing for free rotation by the third right rotation shaft 3109 provided on the end portion of the negative side in the X-direction of the second right joint member 3102. Also, the end portion on the negative side in the X-direction of the third right joint member 3103 is joined to the first X end right clamp unit, not illustrated, for gripping the resin sheet material 2.

The end portion on the negative side in the X-direction of the first left joint member 3104 is supported in a manner allowing for free rotation by the first left rotation shaft 3110 provided on the end portion of the positive side in the X-direction of the central joint member 3100. The end portion on the negative side in the X-direction of the second left joint member 3105 is supported in a manner allowing for free rotation by the second left rotation shaft 3111 provided on the end portion of the positive side in the X-direction of the first left joint member 3104. The end portion on the negative side in the X-direction of the third left joint member 3106 is supported in a manner allowing for free rotation by the third left rotation shaft 3112 provided on the end portion of the positive side in the X-direction of the second left joint member 3105. Also, the end portion on the positive side in the X-direction of the third left joint member 3106 is joined to the first X end left clamp unit, not illustrated, for gripping the resin sheet material 2.

The lower surface along the Z-direction of the central joint member 3100 corresponds to a post contact; surface 3100a where the tip portion of the first bending post 67A makes contact; and the upper surface along the Z-direction corresponds to a sheet contact surface 3100b where the resin sheet material 2 makes contact. Also, in a central portion of the central joint member 3100, a guide hole 3100c is formed as a through-hole that extends along the Z-direction from the post contact surface 3100a to the sheet, contact surface 3100b. A tapered surface 3100d is formed on the post contact surface 3100a side of the guide hole 3100c. Also, the sheet contact surface 3100b of the central joint member 3100 is provided with a plurality (four in the example of FIG. 13) of pin members 3100e extending upward along the Z-direction.

The first bending post 67A includes a plurality (three in the example of FIG. 13) of contact members 6711, 6712, 6713 with different lengths in the X-direction and a first column member 6710 on which one of the plurality of contact members 6711 to 6713 is detachably mounted. Note that in the example of FIG. 13, the first contact member 6711 of the three contact members 6711 to 6713 is mounted on the tip portion of the first column member 6710.

The upper surfaces along the Z-direction of the contact members 6711, 6712, 6713 correspond to contact surfaces 6711a, 6712a, 6713a that come into contact; with the first bending portion 310A. Bending post pins 6711b, 6712b, 6713b that extend along the Z-direction are centrally provided on the contact members 6711, 6712, 6713. The outer diameters of the bending post pins 6711b, 6712b, 6713b are slightly less than the inner diameter of the guide hole 3100c of the first bending portion 310A. Thus, the bonding post pins 6711b, 6712b, 6713b are insertable into the guide hole 3100c of the first bonding portion 310A.

Also, in terms of the length along the X-direction of the contact surface, the contact surface 6711a of the first contact member 6711 is the shortest, and the contact surface 6713a of the third contact member 6713 is the longest.

Specifically, the length along the X-direction of the contact surface 6711a of the first contact member 6711 is less than the length along the X-direction between the first right rotation shaft 3107 and the first left rotation shaft 3110 of the first bending portion 310A. Thus, when the first bending portion 310A is brought toward the first contact member 6711, the contact surface 6711a comes into contact with only the central joint member 3100.

Figure 14:
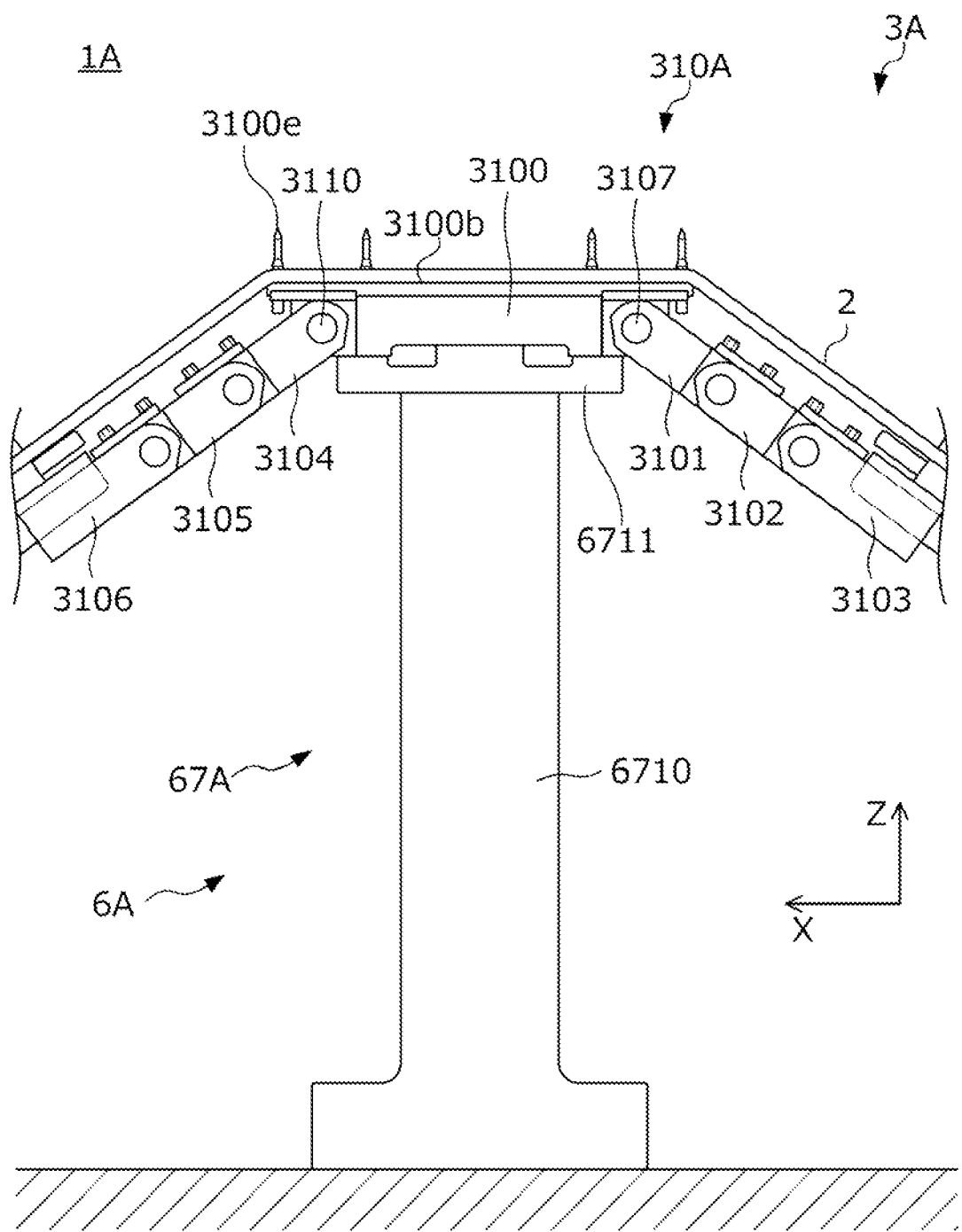
FIG. 14 is a diagram illustrating the configuration of the gripping device and the forming device in a case where a first contact member is mounted on a first bending post.

Accordingly, when the first bending portion 310A is brought toward the first bending post 67A mounted with the first contact member 6711 and the bending post pin 6711b is inserted into the guide hole 3100c of the first; bending portion 310A, the first contact member 6711 comes into contact with only the central joint member 3100. Thus, as illustrated in FIG. 14, the first bending portion 310A bends at the first right rotation shaft 3107 end the first left rotation shaft 3110 and protrudes upward. Also, when the first bending portion 310A bends, the resin sheet material gripped by the first X end right clamp unit and the first X end left clamp unit provided at both ends is brought toward the sheet contact surface 3100b, pierced by the pin members 3100e as illustrated in FIG. 14, and fixed to the sheet contact surface 3100b.

Returning to FIG. 13, the length along the X-direction of the contact surface 6712a of the second contact member 6712 is greater than the length along the X-direction between the first right rotation shaft 3107 and the first left rotation shaft 3110 and less than the length along the X-direction between the second right rotation shaft 3108 and the second left rotation shaft 3111. Thus, when the first bending portion 310A is brought toward the second contact member 6712, the contact surface 6712a comes into contact with the central joint member 3100, the first right joint member 3101, and the first left joint member 3104.

The length along the X-direction of the contact surface 6713a of the third contact member 6713 is greater than the length along the X-direction between the second right rotation shaft 3108 and the second left rotation shaft 3111 and less than the length along the X-direction between the third right rotation shaft 3109 and the third left rotation shaft 3112. Thus, when the first bending portion 310A is brought toward the third contact member 6713, the contact surface 6713a comes into contact with the central joint member 3100, the first right joint member 3101, the second right joint member 3102, the first left joint member 3104, and the second left joint member 3104.

Figure 15:
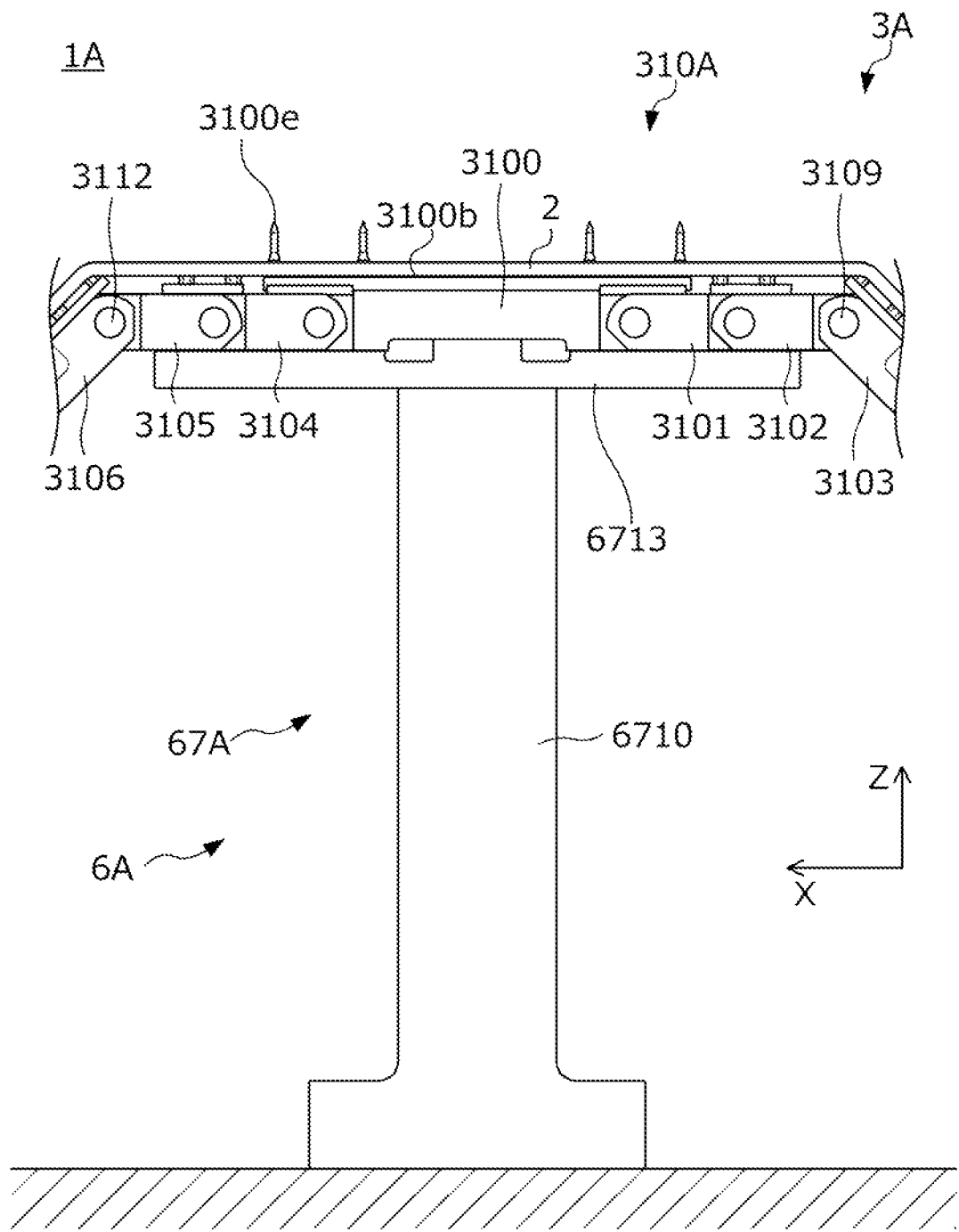
FIG. 15 is a diagram illustrating the configuration of the gripping device and the forming device in a case where a third contact member is mounted on the first bending post.

Accordingly, when the first bending portion 310A is brought toward the first bending post 67A mounted with the third contact member 6713 and the bending post pin 6713b is inserted into the guide hole 3100c of the first bending portion 310A, the third contact member 6713 comes into contact with the central joint member 3100, the first right joint member 3101, the second right joint member 3102, the first left joint member 3104, and the second left joint member 3104. Thus, as illustrated in FIG. 15, the first bending portion 310A bends at the third right rotation shaft

3109 and the third left rotation shaft 3112 and protrudes upward. Also, when the first bending portion 310A bends, the resin sheet material gripped by the first X end right clamp unit and the first X end left clamp unit provided at both ends is brought toward the sheet contact surface 3100b, pierced by the pin members 3100e as illustrated in FIG. 14, and fixed to the sheet contact surface 3100b.

According to the resin forming system 1A according to the present embodiment described above, by simply selecting the contact member from the plurality of contact members 6711 to 6713 that corresponds to the protrusion shape of the lower dies and mounting this contact member on the first column member 6710, the bonding structure of the gripping frame can be changed to a shape that corresponds to the lower die surfaces of the lower dies.

Also, in the embodiment described above, the plurality of contact members 6711, 6712, 6713 with different lengths in the X-direction are used. However, the present invention is not limited to this configuration. The contact members used may include an extending/contracting mechanism that allows the length in the X-direction to be adjusted.

EXPLANATION OF REFERENCE NUMERALS

1, 1A Resin forming system
2 Resin sheet material
21X First X side end portion (X side end portion)
22X Second X side end portion (X side end portion)
23X First Y side end portion (Y side end portion)
24Y Second Y side end portion (Y side end portion)
3, 3A Gripping device
30 Gripping frame
31 First X side member (X side member)
310, 310A First bending portion (bending portion)
3100 Central joint member (joint member)
3101 First right, joint member (joint member)
3102 Second right joint member (joint member)
3103 Third right joint member (joint member)
3104 First left joint member (joint member)
3105 Second left joint member (joint member)
3106 Third left joint member (joint member)
3107 First right rotation shaft (rotation shaft)
3108 Second right rotation shaft (rotation shaft)
3109 Third right rotation shaft (rotation shaft)
3110 First left rotation shaft (rotation shaft)
3111 Second left rotation shaft (rotation shaft)
3112 Third left rotation shaft (rotation shaft)
311 First X end right clamp unit (first gripping unit)
312 First X end left clamp unit (second gripping unit)
32 Second X side member (X side member)
320 Second bending portion (bending portion)
321 Second X end left clamp unit (first gripping unit)
322 Second X end right clamp unit (second gripping unit)
395 First X-axis actuator (stretching device)
356 Second X-axis actuator (stretching device)
397 First Y-axis actuator (stretching device)
398 Second Y-axis actuator (stretching device)
4 Sheet supply unit
5 Heating device
6, 6A Forming device
61 First lower die (lower die)
61a First lower die surface (lower die surface)
61b First protrusion surface (protrusion surface)
62 Second lower die (lower die)
62a Second lower die surface (lower die surface)
69 Lowering device
66 Upper die
67, 67a First bonding post (bending support portion)
6710 First column member (column member)
6711 First contact member (contact member)
6712 Second contact member (contact member)
6713 Third contact member (contact member)
68 Second bending post (bending support portion)

The invention claimed is:

1. A resin forming system, comprising:
a gripping device including a gripping frame for gripping a resin sheet material at Y side end portions on both sides in an X-direction and X side end portions on both sides in a Y-direction orthogonal to the X-direction;
a heating device for heating a resin sheet material gripped by the gripping frame; and
a forming device for clamping together a lower die and an upper die installed between a resin sheet material heated by the heating device and forming a product, wherein
the forming device includes
a lowering device for lowering the gripping device and bringing a resin sheet material gripped by the gripping frame toward the lower die, and
a pair of bending support portions provided on both sides in the Y-direction of the lower die, each one of the pair of bending support portions coming into contact with a portion of the gripping frame when the gripping device is lowered by the lowering device and bending the gripping frame to protrude upward in a side view along the Y-direction;
the gripping frame includes X side members that extend along the X side end portions of a resin sheet material;
each one of the X side members includes a bending portion where the bending support portion makes contact; and
the bending portion includes a plurality of joint members that extend in the X-direction, and a plurality of rotation shafts that extend in the Y-direction and support, in a manner allowing for free rotation, end portions of adjacent pairs of joint members of the plurality of joint members.

2. The resin forming system according to claim 1, wherein
each one of the X side members includes a first gripping unit and a second gripping unit for gripping the X side end portions, provided on both sides in the X-direction of the bending portion; and
end portions on both sides in the X-direction of the bending portion are joined, in a manner allowing for free rotation about a shaft that extends in the Y-direction, to the first gripping unit and the second gripping unit.

3. The resin forming system according to claim 1 or 2, wherein
the pair of bending support portions each include a plurality of contact members with a contact surface that comes into contact with the joint members and a column member on which one of the plurality of contact members can be detachably mounted; and
the contact surfaces of the plurality of contact members have different lengths in the X-direction.

4. A resin forming method, comprising:
gripping with a gripping frame a resin sheet material at Y side end portions on both sides in an X-direction and X side end portions on both sides in a Y-direction orthogonal to the X-direction;
heating a resin sheet material gripped by the gripping frame; and forming a product by lowering a gripping device including the gripping frame after the heating, bringing a resin sheet material gripped by the gripping frame toward a lower die, then clamping together the lower die and an upper die provided opposing the lower die, wherein in the forming, after the gripping device is lowered until a bending portion provided to X side members that extend along the X side end portions of a resin sheet material of the gripping frame comes into contact with a pair of bending support portions provided on both sides in the Y-direction on the lower die, the gripping device is further lowered, bending the gripping frame to protrude upward in a side view along the Y-direction, and the bending portion includes a plurality of joint members that extend in the X-direction, and a plurality of rotation shafts that extend in the Y-direction and support, in a manner allowing for free rotation, end portions of adjacent pairs of joint members of the plurality of joint members.

\* \* \* \* \*